US011234139B2

(12) United States Patent
Huang

(10) Patent No.: US 11,234,139 B2
(45) Date of Patent: *Jan. 25, 2022

(54) MIMO TRAINING METHOD AND WIRELESS DEVICE

(71) Applicant: Panasonic Corporation, Osaka (JP)

(72) Inventor: Lei Huang, Singapore (SG)

(73) Assignee: Panasonic Corporation, Osaka (JP)

( * ) Notice: Subject to any disclaimer, the term of this patent is extended or adjusted under 35 U.S.C. 154(b) by 36 days.

This patent is subject to a terminal disclaimer.

(21) Appl. No.: 16/797,668

(22) Filed: Feb. 21, 2020

(65) Prior Publication Data

US 2020/0196164 A1 Jun. 18, 2020

Related U.S. Application Data

(63) Continuation of application No. 15/431,462, filed on Feb. 13, 2017, now Pat. No. 10,616,773, which is a (Continued)

(30) Foreign Application Priority Data

Aug. 18, 2014 (JP) .................................. 2014-165725

(51) Int. Cl.
| | |
|---|---|
| *H01Q 15/00* | (2006.01) |
| *H04W 16/28* | (2009.01) |
| *H04B 7/06* | (2006.01) |
| *H04B 7/0491* | (2017.01) |

(Continued)

(52) U.S. Cl.
CPC ........ *H04W 16/28* (2013.01); *H01Q 15/0033* (2013.01); *H04B 7/0413* (2013.01);
(Continued)

(58) Field of Classification Search
CPC ............................ H04B 7/0684; H04B 7/0851
See application file for complete search history.

(56) References Cited

U.S. PATENT DOCUMENTS

| | | | |
|---|---|---|---|
| 9,651,679 B1 | 5/2017 | Tollefson | |
| 10,616,773 B2 * | 4/2020 | Huang | ................. H04B 7/0413 |

(Continued)

FOREIGN PATENT DOCUMENTS

WO 2014/074894 A1 5/2014

OTHER PUBLICATIONS

Communication pursuant to Article 94(3) EPC, dated Aug. 5, 2019, for the related European Patent Application No. 15834571.0, 10 pages.

(Continued)

*Primary Examiner* — Salvador E Rivas
(74) *Attorney, Agent, or Firm* — Seed IP Law Group LLP

(57) ABSTRACT

An MIMO training method including performing transmission sector sweeping using an initiator including a plurality of transmitting antennas, selecting a set of at least one transmission sector for each of the transmitting antennas using a responder including a plurality of receiving antennas; performing reception sector sweeping using the initiator, selecting a set of at least one reception sector for each of the plurality of receiving antennas using the responder, performing beam combination training using the initiator; and selecting a determined number of sector pairs consisting of a transmission sector and a reception sector from among the selected set of transmission sectors and the selected set of reception sectors using the responder, wherein the transmitting antennas in the selected sector pairs differ from one another, and the receiving antennas in the selected sector pairs differ from one another.

10 Claims, 28 Drawing Sheets

Related U.S. Application Data continuation of application No. PCT/JP2015/003159, filed on Jun. 24, 2015.

(51) Int. Cl.
*H04B 7/0413* (2017.01)
*H04B 7/08* (2006.01)
*H01Q 3/24* (2006.01)

(52) U.S. Cl.
CPC ......... *H04B 7/0491* (2013.01); *H04B 7/0608* (2013.01); *H04B 7/0617* (2013.01); *H04B 7/0695* (2013.01); *H04B 7/088* (2013.01); *H01Q 3/24* (2013.01); *H04B 7/0684* (2013.01); *H04B 7/0802* (2013.01)

(56) References Cited

U.S. PATENT DOCUMENTS

| | | | | |
|---|---|---|---|---|
| 10,797,668 B2 * | 10/2020 | Lee | ............. | H03G 1/0029 |
| 2007/0230639 A1 * | 10/2007 | Stirling-Gallacher | ............. | H04B 7/0408 375/347 |
| 2011/0110453 A1 * | 5/2011 | Prasad | ............. | H04B 7/088 375/285 |
| 2012/0230380 A1 | 9/2012 | Keusgen et al. | | |
| 2013/0315325 A1 * | 11/2013 | Wang | ............. | H04B 7/0695 375/267 |
| 2014/0126620 A1 | 5/2014 | Maltsev et al. | | |

OTHER PUBLICATIONS

Extended European Search Report, dated Jul. 28, 2017, for related European Application No. 15834571.0.
International Search Report, dated Sep. 8, 2015, for International Application No. PCT/JP2015/003159.
IEEE Std 802.11ad(TM)—2012, Dec. 2012.
Eric Torkildson et al., "Indoor Millimeter Wave MIMO: Feasibility and Performance," IEEE Transactions on Wireless Communications, vol. 10, No. 12, pp. 4150-4160, Dec. 2011.

* cited by examiner

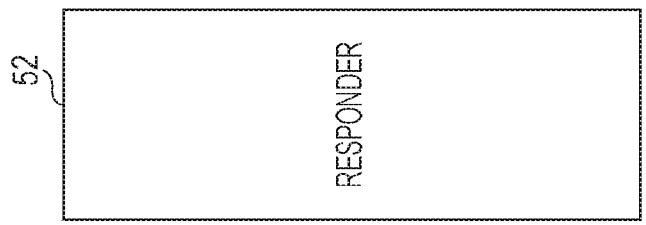
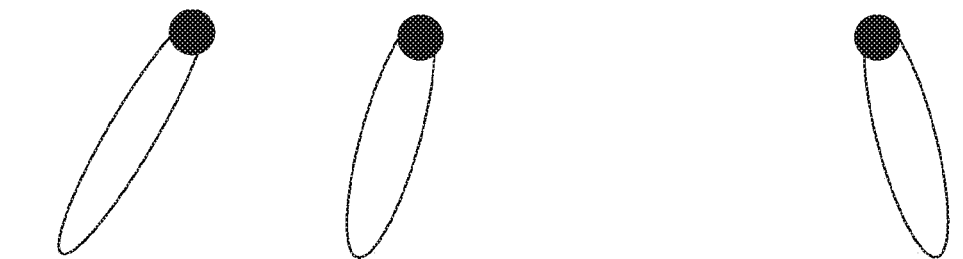
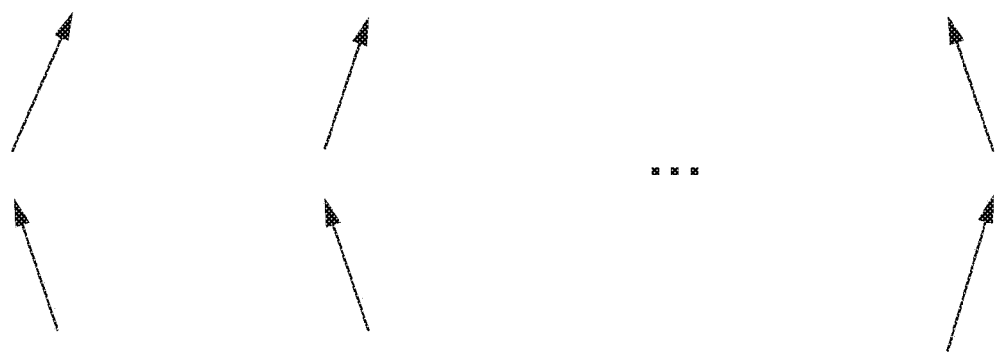
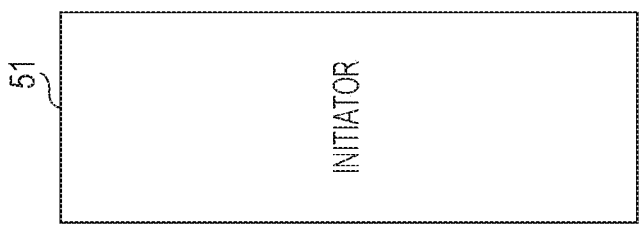
FIG. 5

FIG. 13B

| TX | RX | 0 | | 1 | | 2 | | 3 | |
|----|----|---|---|---|---|---|---|---|---|
|    |    | 3 | 12 | 7 | 11 | 5 | 13 | 6 | 15 |
| 0 | 0  | SNIR$_{0:0, 0:3}$ | SNIR$_{0:0, 0:12}$ | SNIR$_{0:0, 1:7}$ | SNIR$_{0:0, 1:11}$ | SNIR$_{0:0, 2:5}$ | SNIR$_{0:0, 2:13}$ | SNIR$_{0:0, 3:6}$ | SNIR$_{0:0, 3:15}$ |
|   | 15 | SNIR$_{0:15, 0:3}$ | SNIR$_{0:15, 0:12}$ | SNIR$_{0:15, 1:7}$ | SNIR$_{0:15, 1:11}$ | SNIR$_{0:15, 2:5}$ | SNIR$_{0:15, 2:13}$ | SNIR$_{0:15, 3:6}$ | SNIR$_{0:15, 3:15}$ |
| 1 | 2  | SNIR$_{1:2, 0:3}$ | SNIR$_{1:2, 0:12}$ | SNIR$_{1:2, 1:7}$ | SNIR$_{1:2, 1:11}$ | SNIR$_{1:2, 2:5}$ | SNIR$_{1:2, 2:13}$ | SNIR$_{1:2, 3:6}$ | SNIR$_{1:2, 3:15}$ |
|   | 13 | SNIR$_{1:13, 0:3}$ | SNIR$_{1:13, 0:12}$ | SNIR$_{1:13, 1:7}$ | SNIR$_{1:13, 1:11}$ | SNIR$_{1:13, 2:5}$ | SNIR$_{1:13, 2:13}$ | SNIR$_{1:13, 3:6}$ | SNIR$_{1:13, 3:15}$ |
| 2 | 4  | SNIR$_{2:4, 0:3}$ | SNIR$_{2:4, 0:12}$ | SNIR$_{2:4, 1:7}$ | SNIR$_{2:4, 1:11}$ | SNIR$_{2:4, 2:5}$ | SNIR$_{2:4, 2:13}$ | SNIR$_{2:4, 3:6}$ | SNIR$_{2:4, 3:15}$ |
|   | 11 | SNIR$_{2:11, 0:3}$ | SNIR$_{2:11, 0:12}$ | SNIR$_{2:11, 1:7}$ | SNIR$_{2:11, 1:11}$ | SNIR$_{2:11, 2:5}$ | SNIR$_{2:11, 2:13}$ | SNIR$_{2:11, 3:6}$ | SNIR$_{2:11, 3:15}$ |
| 3 | 6  | SNIR$_{3:6, 0:3}$ | SNIR$_{3:6, 0:12}$ | SNIR$_{3:6, 1:7}$ | SNIR$_{3:6, 1:11}$ | SNIR$_{3:6, 2:5}$ | SNIR$_{3:6, 2:13}$ | SNIR$_{3:6, 3:6}$ | SNIR$_{3:6, 3:15}$ |
|   | 9  | SNIR$_{3:9, 0:3}$ | SNIR$_{3:9, 0:12}$ | SNIR$_{3:9, 1:7}$ | SNIR$_{3:9, 1:11}$ | SNIR$_{3:9, 2:5}$ | SNIR$_{3:9, 2:13}$ | SNIR$_{3:9, 3:6}$ | SNIR$_{3:9, 3:15}$ |

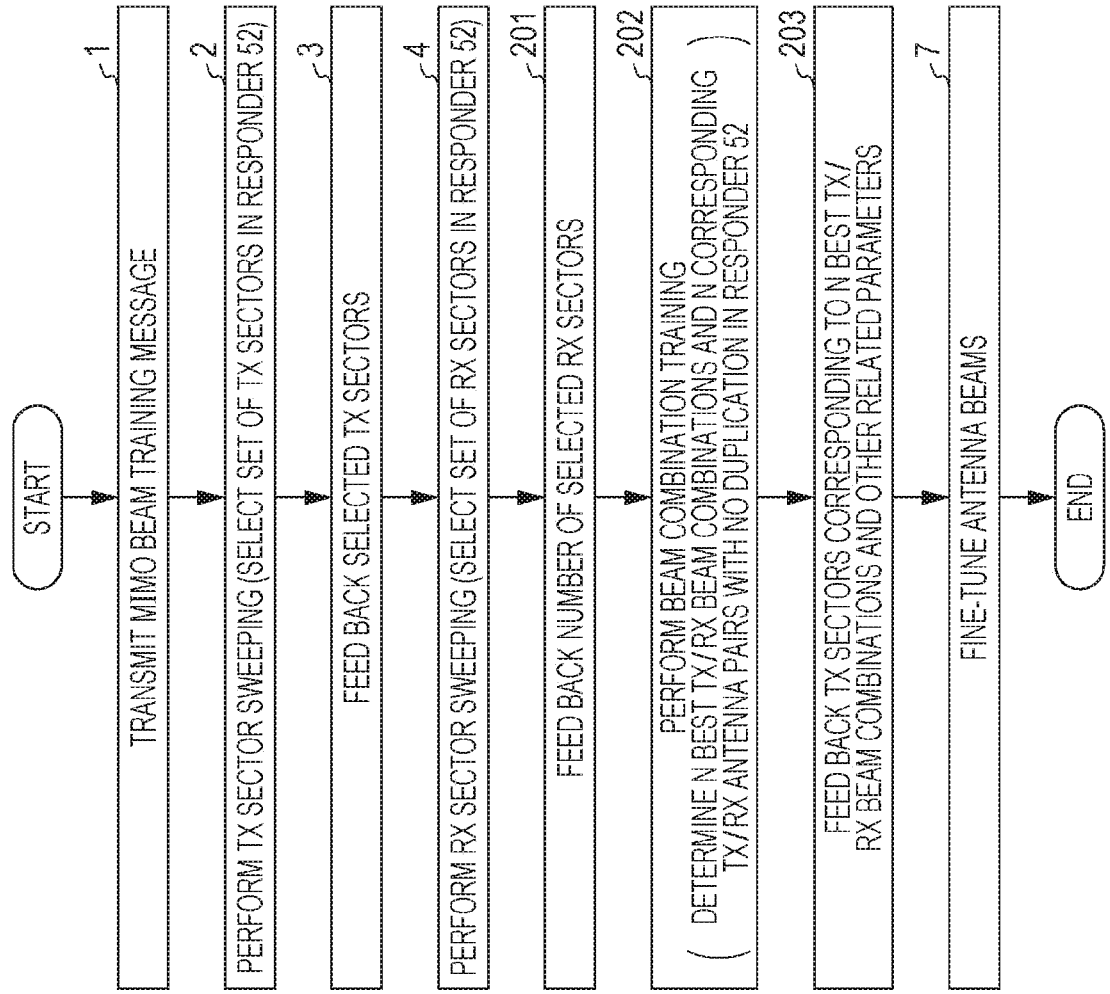

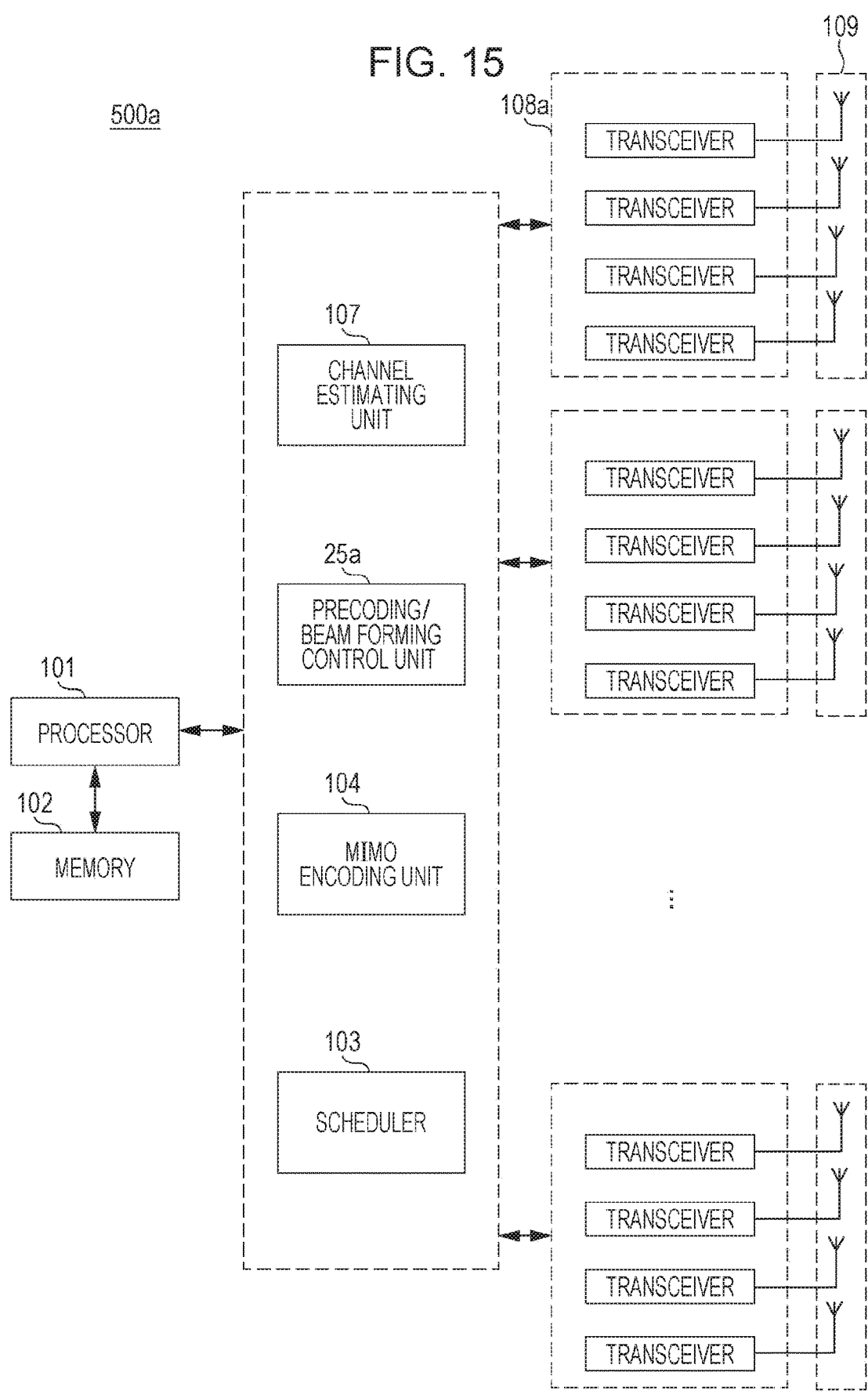

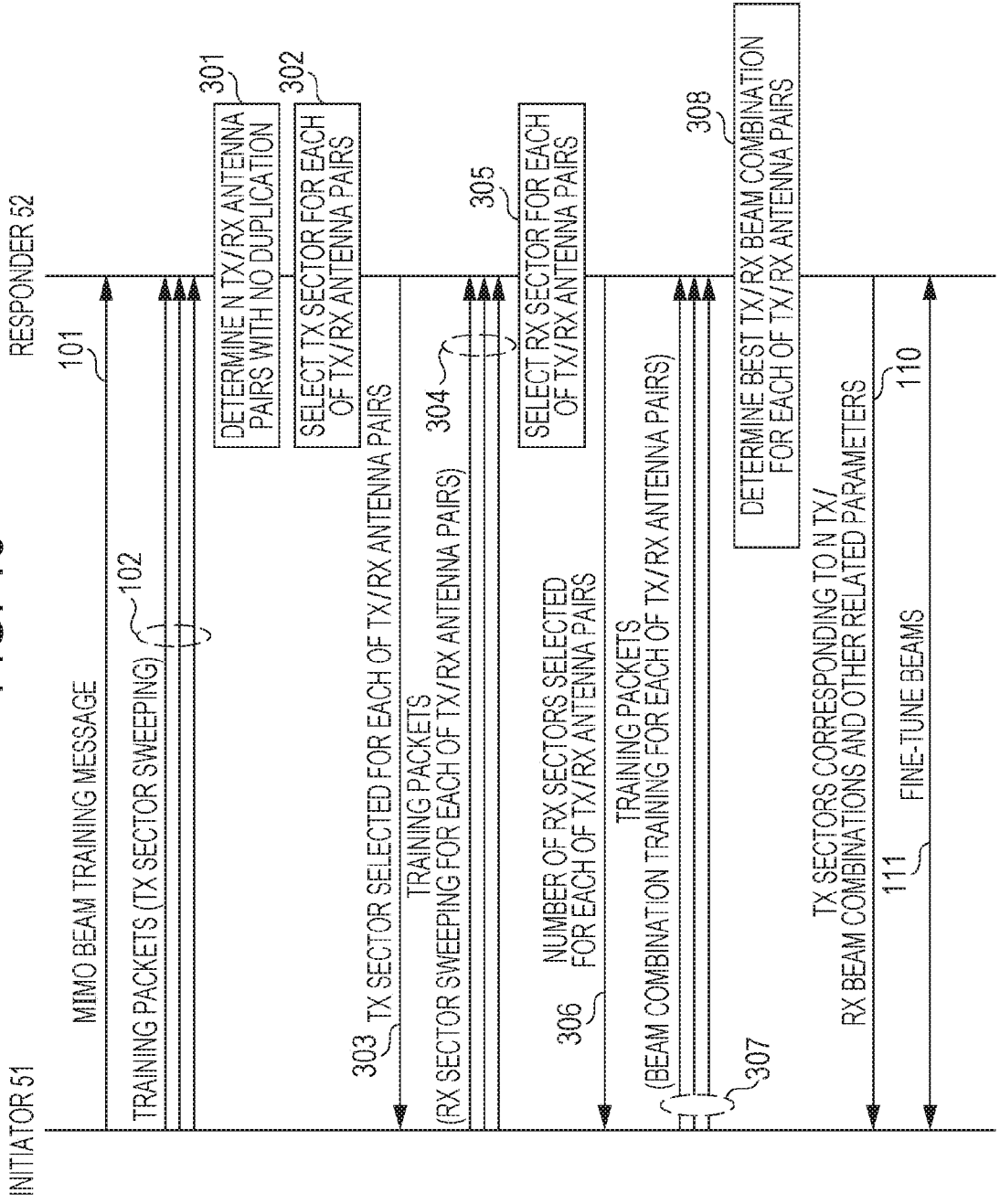

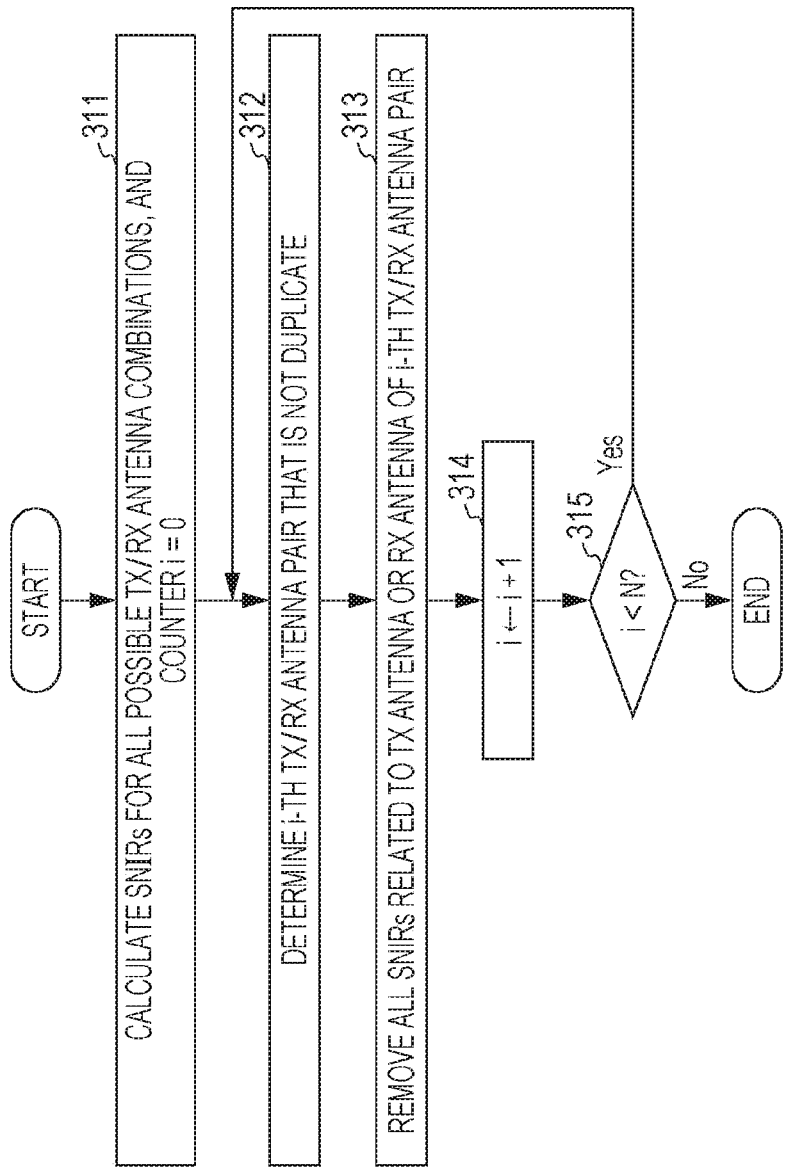

FIG. 19

| TX \ RX | 0 | 1 | 2 | 3 |
|---|---|---|---|---|
| 0 | $SNIR_{0,0}$ | $SNIR_{0,1}$ | $SNIR_{0,2}$ | $SNIR_{0,3}$ |
| 1 | $SNIR_{1,0}$ | $SNIR_{1,1}$ | $SNIR_{1,2}$ | $SNIR_{1,3}$ |
| 2 | $SNIR_{2,0}$ | $SNIR_{2,1}$ | $SNIR_{2,2}$ | $SNIR_{2,3}$ |
| 3 | $SNIR_{3,0}$ | $SNIR_{3,1}$ | $SNIR_{3,2}$ | $SNIR_{3,3}$ |

FIG. 21B

| TX\RX | 0 | 15 | 2 | 13 | 4 | 11 | 6 | 9 |
|---|---|---|---|---|---|---|---|---|
| 3 | | | | | | | | |
| 0 | | | | | | | | |
| 12 | | | | | | | | |
| 7 | $SNR_{1,2,0:3}$ | $SNR_{1,2,0:12}$ | | $SNR_{0,0,1:7}$ | $SNR_{0,0,1:11}$ | | | |
| 11 | $SNR_{1,13,0:3}$ | $SNR_{1,13,0:12}$ | | $SNR_{0,15,1:7}$ | $SNR_{0,15,1:11}$ | | | |
| 1 | | | | | | | | |
| 5 | | | | | | $SNR_{3,6,2:5}$ | $SNR_{2,4,3:6}$ | |
| 2 | | | | | | $SNR_{3,9,2:5}$ | $SNR_{3,6,2:13}$ | |
| 13 | | | | | | | $SNR_{2,11,3:6}$ | $SNR_{2,4,3:15}$ |
| 6 | | | | | | | $SNR_{3,9,2:13}$ | $SNR_{2,11,3:15}$ |
| 3 | | | | | | | | |
| 15 | | | | | | | | |

FIG. 25

| TX\RX | 0 | 0 | 15 | 1 | 0 | 15 | 2 | 0 | 15 | 3 | 0 | 15 |
|---|---|---|---|---|---|---|---|---|---|---|---|---|
| 0 | | | | | $SNR_{0:0, 1:0}$ | $SNR_{0:0, 1:15}$ | | | | | | |
| | | | | ... | ... | ... | | | | | | |
| | 15 | | | | $SNR_{0:15, 1:0}$ | $SNR_{0:15, 1:15}$ | | | | | | |
| 1 | 2 | $SNR_{1:2, 0:0}$ | $SNR_{1:2, 0:15}$ | | | | | | | | | |
| | ... | ... | ... | | | | | | | | | |
| | 13 | $SNR_{1:13, 0:0}$ | $SNR_{1:13, 0:15}$ | | | | | | | | | |
| 2 | 4 | | | | | | | | | $SNR_{2:4, 3:0}$ | ... | $SNR_{2:4, 3:15}$ |
| | 11 | | | | | | | | | $SNR_{2:11, 3:0}$ | ... | $SNR_{2:11, 3:15}$ |
| 3 | 6 | | | | | | $SNR_{3:6, 2:0}$ | ... | $SNR_{3:6, 2:15}$ | | | |
| | 9 | | | | | | $SNR_{3:9, 2:0}$ | ... | $SNR_{3:9, 2:15}$ | | | |

→ $SNR_{1:13, 0:3}$

→ $SNR_{0:15, 1:7}$

→ $SNR_{3:6, 2:5}$

→ $SNR_{2:4, 3:6}$

BEST SIGNAL QUALITY: $SNR_{1:13, 0:3}$

MIMO TRAINING METHOD AND WIRELESS DEVICE

BACKGROUND

1. Technical Field

The present disclosure relates to a multiple input multiple output (MIMO) training method for a MIMO operation performed in a wireless communication system and a wireless device.

2. Description of the Related Art

A network using a license-free 60 GHz (millimeter wave) band has received a significant amount of attention in recent years. The wireless high definition (HD) technology that allows multi-gigabit wireless streaming of Hi-Vision audio, video, and data among consumer electronics, personal computers, or portable devices is a first industrial 60-GHz (millimeter wave) band standard. An example of other multi-gigabit wireless communication technologies that use 60-GHz band is the WiGig technology standardized by Institute of Electrical and Electronic Engineers (IEEE) as "IEEE 802.11ad" (refer to, for example, IEEE Std 802.11ad™-2012, December 2012).

Unlike other IEEE 802.11 technologies using a 2.4 GHz or 5 GHz band, the WiGig technology employs beam forming to perform directional transmission. In 60-GHz millimeter wave band, the signal wavelength is relatively short, as compared with a typical object size in a propagation environment. Accordingly, ray-like propagation having a plurality of discrete spatial signal paths is dominant. Thus, by directing the beam of each of a transmission antenna (hereinafter referred to as a "TX antenna") and a reception antenna (hereinafter referred to as an "RX antenna") to an excellent spatial signal path, the quality of the signal, such as a signal-to-noise ratio (SNR), may be significantly increased.

In the WiGig technology, to select a beam having the best signal quality (also referred to as a "sector"), a phased beam training protocol (also referred to as "antenna beam training") for the transmitter or the receiver to sweep all the antenna beams (the sectors) is employed. In a phase called the sector level sweep phase, antenna beam training is coarsely performed. Subsequently, a phase, called the beam refinement protocol phase or beam tracking phase, is performed to provide the fine tuning of an antenna beam for more excellent signal quality.

SUMMARY

In existing antenna beam training for the MIMO operation, a plurality of sectors are not sufficiently taken into account. Thus, although each of array antennas may simultaneously form (select) a single antenna beam, a part of a plurality of array antennas used for transmission of each of the streams may be overlapped, as a result of the antenna beam training.

One non-limiting and exemplary embodiment facilitates providing a MIMO training method and a wireless device capable of appropriately selecting the best combination of TX/RX beams in the wireless device having a plurality of array antennas to perform the MIMO operation normally.

In one general aspect, the techniques disclosed here feature an MIMO training method including performing transmission sector sweeping using an initiator including a plurality of transmitting antennas, selecting a set of at least one transmission sector for each of the transmitting antennas using a responder including a plurality of receiving antennas, performing reception sector sweeping using the initiator, selecting a set of at least one reception sector for each of the plurality of receiving antennas using the responder, performing beam combination training using the initiator, and selecting a determined number of sector pairs consisting of a transmission sector and a reception sector from among the selected set of transmission sectors and the selected set of reception sectors using the responder. The transmitting antennas in the selected sector pairs differ from one another, and the receiving antennas in the selected sector pairs differ from one another.

According to the aspect of the present disclosure, the best combination of TX/RX beams may be appropriately selected in a wireless device having a plurality of array antennas, and the MIMO operation may be normally performed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates an example of the configuration of a wireless system according to the present disclosure;

FIG. 13B illustrates an example of SNIR for a TX/RX sector combination according to the first exemplary embodiment of the present disclosure;

FIG. 14 is a flowchart of the antenna beam training process according to the first exemplary embodiment of the present disclosure;

FIG. 15 is a block diagram of the configuration of another wireless device according to the first exemplary embodiment of the present disclosure;

FIG. 16 is a sequence diagram of an antenna beam training process according to a second exemplary embodiment of the present disclosure;

FIG. 17 is a flowchart of a method for determining a TX/RX antenna pair according to the second exemplary embodiment of the present disclosure;

FIG. 19 illustrates an example of a TX sector sweeping process according to the second exemplary embodiment of the present disclosure;

FIG. 21B illustrates an example of SNIR for a TX/RX sector combination according to the second exemplary embodiment of the present disclosure;

FIG. 25 illustrates an example of RX sector sweeping according to the third exemplary embodiment of the present disclosure.

DETAILED DESCRIPTION

Exemplary embodiments of the present disclosure are described in detail below with reference to the accompanying drawings. Note that in the following exemplary embodiments, the same reference symbols are used for the same constituent elements, and the same descriptions of the constituent elements are not repeated.

Underlying Knowledge Forming Basis of the Present Disclosure

WiGig devices may include a plurality of antennas so as to form a plurality of independent beams/sectors. Each of the antennas may be a phased array antenna. In the WiGig technology, the antenna configuration is used to select an antenna beam (a sector). That is, a single spatial stream is transmitted via a single antenna beam at a time. The WiGig technology is based on a single spatial stream transmission scheme and provides a maximum of 6.7-Gbps data rate in a physical layer (PHY).

One of widely used applications of the WiGig technology is conversion to a wired digital interface. For example, the WiGig technology may be employed for wireless HDMI® (High-Definition Multimedia Interface) link for video streaming. Since a leading-edge wired digital interface (e.g., USB3.5 or HDMI® 1.3) provides a data rate of up to several tens of Gbps, the WiGig technology needs to be improved to cope with the wired digital interface.

Like other IEEE802.11 technologies for an operation in 2.4 or 5-GHz band (e.g., IEEE802.11n or IEEE802.11ac), to obtain a data rate of up to several tens of Gbps in a physical layer, a spatial multiplexing MIMO technology that allows a plurality of spatial streams to be simultaneously transmitted via a plurality of spatial paths is a next-generation WiGig technology.

Figure 1:
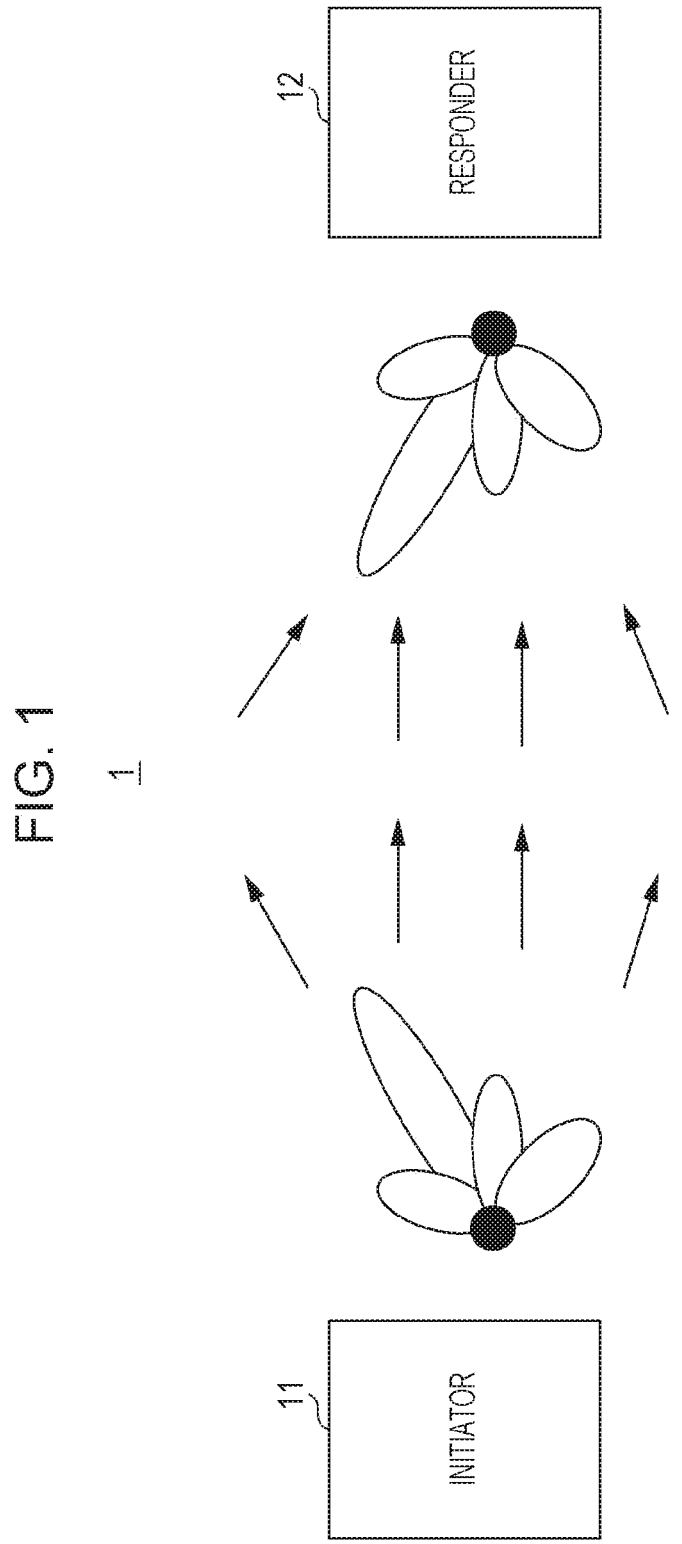
FIG. 1 illustrates an example of the configuration of a wireless system that performs a MIMO operation.

A wireless system that employs an existing multi-stage beam training method to perform a MIMO operation is described in, for example, U.S. Patent Application Publication No. 2013/0315325. FIG. 1 illustrates a MIMO operation in a wireless system 1 based on existing technology. The wireless system 1 includes an initiator 11 and a responder 12. In an example illustrated in FIG. 1, the initiator 11 serves as a transmitter of a MIMO signal, and the responder 12 serves as a receiver of a MIMO signal. Each of the initiator 11 and the responder 12 includes a single array antenna that supports a MIMO operation using a plurality of spatial streams. The array antenna in each of the initiator 11 and the responder 12 forms a plurality of antenna beams/sectors at a time. Before the MIMO operation is performed, antenna beam training is applied to the array antenna of each of the initiator 11 and the responder 12. Through the antenna beam training, the best pair of a transmission sector (a TX sector) and a reception sector (an RX sector) may be obtained for transmission of a plurality of MIMO spatial streams.

Figure 2:
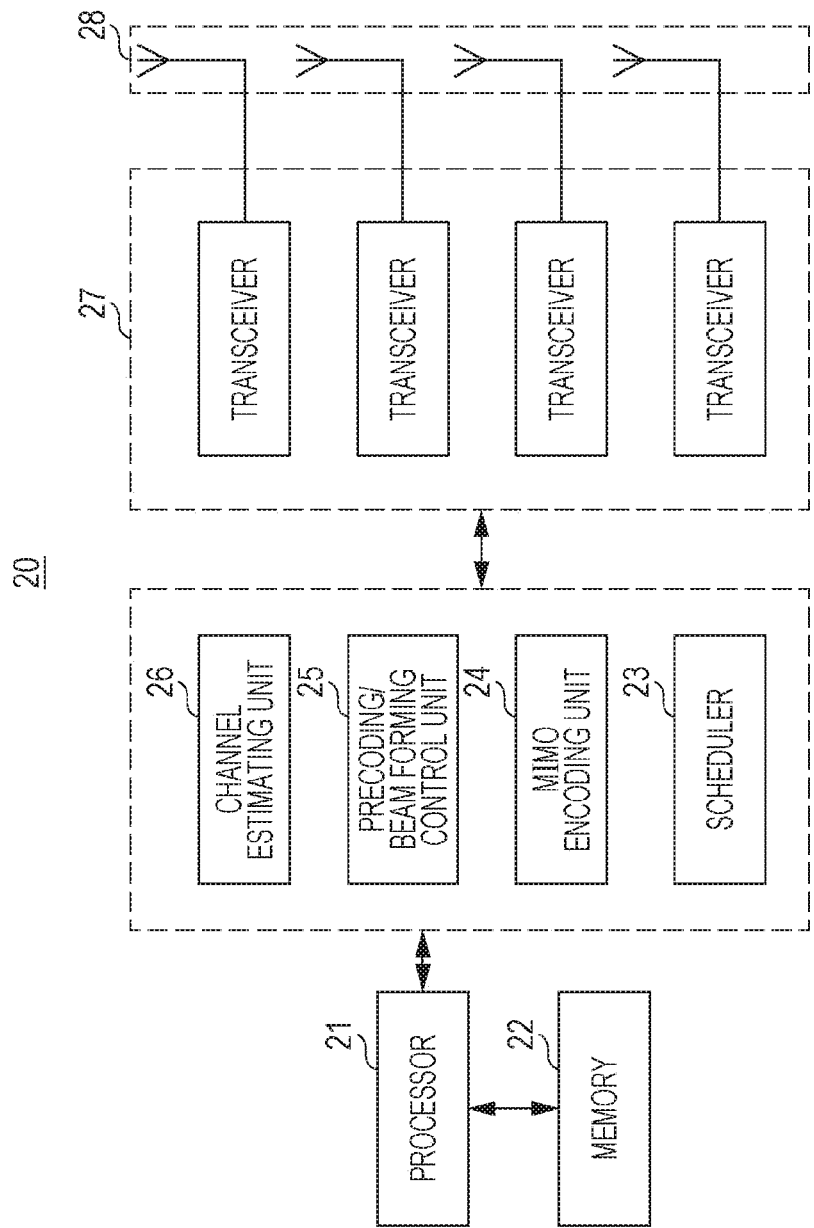
FIG. 2 is a block diagram of the configuration of a wireless device.

FIG. 2 is a block diagram of the configuration of a wireless device 20 of the wireless system 1 based on existing technology. The wireless device 20 is capable of functioning either the initiator 11 or the responder 12. The wireless device 20 includes a processor 21, a memory 22, a scheduler 23, a MIMO encoding unit 24, a precoding/beam forming control unit 25, a channel estimating unit 26, a transmitting and receiving unit 27, and an array antenna 28. Each of antenna elements of the array antenna 28 are connected to one of a plurality of transceivers in the transmitting and receiving unit 27.

The transmitting and receiving unit 27 receives a radio frequency (RF) signal via the array antenna 28. Thereafter, the transmitting and receiving unit 27 converts the received signal into a baseband signal and outputs the baseband signal to the processor 21. In addition, the transmitting and receiving unit 27 converts a baseband signal received from the processor 21 into an RF signal and transmits the RF signal via the array antenna 28. The processor 21 processes the received baseband signal and starts function modules that perform a variety of processes of the wireless device 20. In particular, the precoding/beam forming control unit 25 has a function of performing a MIMO precoding process and forming a plurality of antenna beams in the array antenna 28 at a time. The memory 22 stores an instruction program or data used to control the operation performed by the wireless device 20. Note that for simplicity, hereinafter, the term "array antenna" is also referred to as an "antenna".

Figure 3:
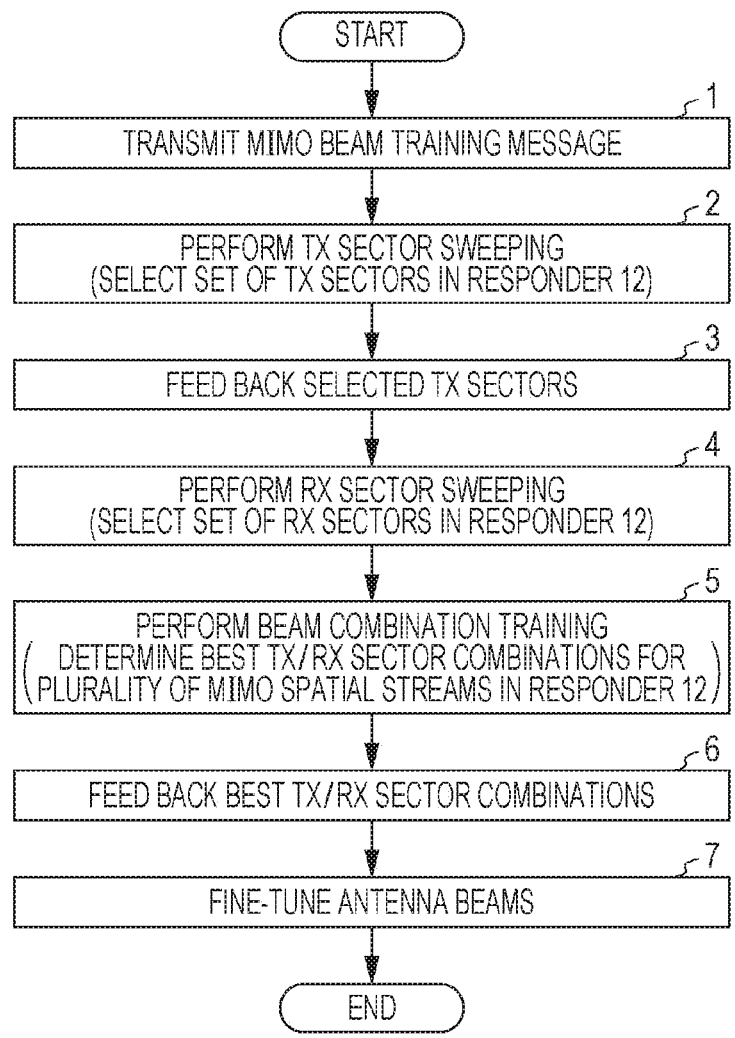
FIG. 3 is a flowchart of an antenna beam training process.

FIG. 3 is a flowchart of an antenna beam training process for MIMO operations performed by the wireless system 1 based on existing technology (MIMO training).

In step 1, the initiator 11 transmits a MIMO beam training message for starting MIMO training. The MIMO beam training message includes MIMO training parameters, such as the number of sectors selected on the transmitting side (the number of TX sectors), the number of sectors selected on the receiving side (the number of RX sectors), and the number of MIMO spatial streams.

In step 2, transmission sector sweeping (TX sector sweeping) is performed. More specifically, the initiator 11 transmits a plurality of training packets via all the sectors of the TX antenna. The responder 12 receives the training packets using the RX antenna set in a quasi omni-directional antenna pattern (hereinafter also simply referred to as an "omnidirectional antenna pattern"). The responder 12 records the received signal quality, such as a signal to noise ratio (SNR), and selects a set of the TX sectors having an excellent received signal quality. In step 3, the responder 12 feeds back the selected TX sectors to the initiator 11. In step 4, reception sector sweeping (RX sector sweeping) is performed. More specifically, the initiator 11 transmits a plurality of training packets using the TX antenna set in an omni-directional antenna pattern. The responder 12 receives the plurality of training packets via all the sectors of the RX antenna. The responder 12 records the received signal quality and selects a set of the RX sectors having excellent received signal quality.

In step 5, beam combination training (sector combination training) is performed. More specifically, the initiator 11 and the responder 12 sweep the TX sectors selected in step 2 and the RX sectors selected in step 4. The responder 12 determines TX/RX beam combinations that are the best for the plurality of MIMO spatial streams on the basis of the Signal-to-Noise-plus-Interference Ratio (SNIR) criterion. In this case, when the SNIR is calculated for a given TX/RX beam combination, transmission from another TX/RX beam combination including the same RX sector as the given TX/RX beam combination is regarded as interference to the TX/RX beam combination. In step 6, the responder 12 feeds back, to the initiator 11, the best TX/RX beam combinations determined in step 5. In step 7, the antenna beams are fine-tuned to improve the signal quality.

Figure 4:
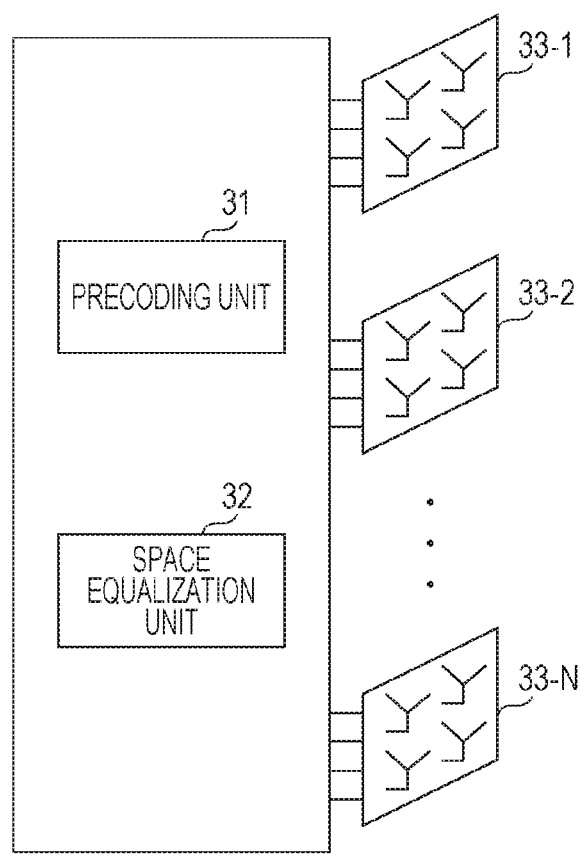
FIG. 4 is a block diagram of the configuration of a wireless device including a plurality of array antennas.

As another configuration of a wireless device using MIMO, a wireless device including a plurality of array antennas is described in "Indoor Millimeter Wave MIMO: Feasibility and Performance", IEEE Transaction on Wireless Communications, pp. 4150-4160, Vol. 10, No. 12, December 2011. FIG. 4 is a block diagram of the configuration of a wireless device 30 based on existing MIMO technology. The wireless device 30 includes a precoder 31, a spatial equalizer 32, and a plurality of array antennas 33-1 to 33-N (N is an integer equal to 2 or greater). In particular, the precoder 31 has a function of forming antenna beams for each of the array antennas 33 at a time.

As described above, the wireless device 20 illustrated in FIG. 2 forms a plurality of antenna beams at a time using the single array antenna 28. In contrast, the wireless device 30 illustrated in FIG. 4 forms a plurality of antenna beams (N antenna beams in FIG. 4) in total at a time by forming a single antenna beam in each of the array antennas 33-1 to 33-N.

In this case, existing antenna beam training for a MIMO operation (refer to FIG. 3) may be applied to wireless devices having a plurality of array antennas (refer to FIG. 4). However, in a case where existing antenna beam training is simply applied to the wireless device, there is a possibility to select, as the best TX/RX beam combinations, a plurality of sectors formed by the same array antenna. That is, although each of the array antennas may form (select) a single antenna beam (a single sector) at the same time, the array antennas used to transmit the streams may be overlapping as a result of the antenna beam training. In such a case, it is difficult to normally operate the MIMO operation.

First Exemplary Embodiment

Configuration of Wireless System

FIG. 5 illustrates the MIMO operation performed by a wireless system 50 according to the present disclosure. The wireless system 50 includes an initiator 51 and a responder 52. Unlike the initiator 11 and the responder 12 illustrated in FIG. 1, each of the initiator 51 and the responder 52 illustrated in FIG. 5 includes a plurality of array antennas to support a MIMO operation using a plurality of spatial streams. Each of the array antennas is capable of forming an antenna beam/sector at the same time.

Before performing a MIMO operation, the antenna beam training is applied to the plurality of array antennas of the initiator 51 and the responder 52 so that the best TX/RX beam combinations for transmission of a plurality of MIMO spatial streams are selected. Since the TX antenna and the RX antenna may form one TX sector and one RX sector, respectively, at a time, each of the best TX/RX beam combinations for MIMO transmission is associated with a particular TX/RX antenna pair. In addition, in a case where the TX antennas and the RX antennas are equal in number, all the TX/RX antenna pairs selected as the best TX/RX beam combinations are not duplicate, since any TX antenna or RX antenna belongs to one TX/RX antenna pair. This is because in a case where the TX/RX antenna pairs are duplicate, a MIMO operation cannot be performed using the TX antenna and/or the RX antenna. In this case, a maximum number of the MIMO spatial streams, which is equal to the minimum number of the TX antennas and RX antennas, are not supported.

Configuration of Wireless Device

Figure 6:
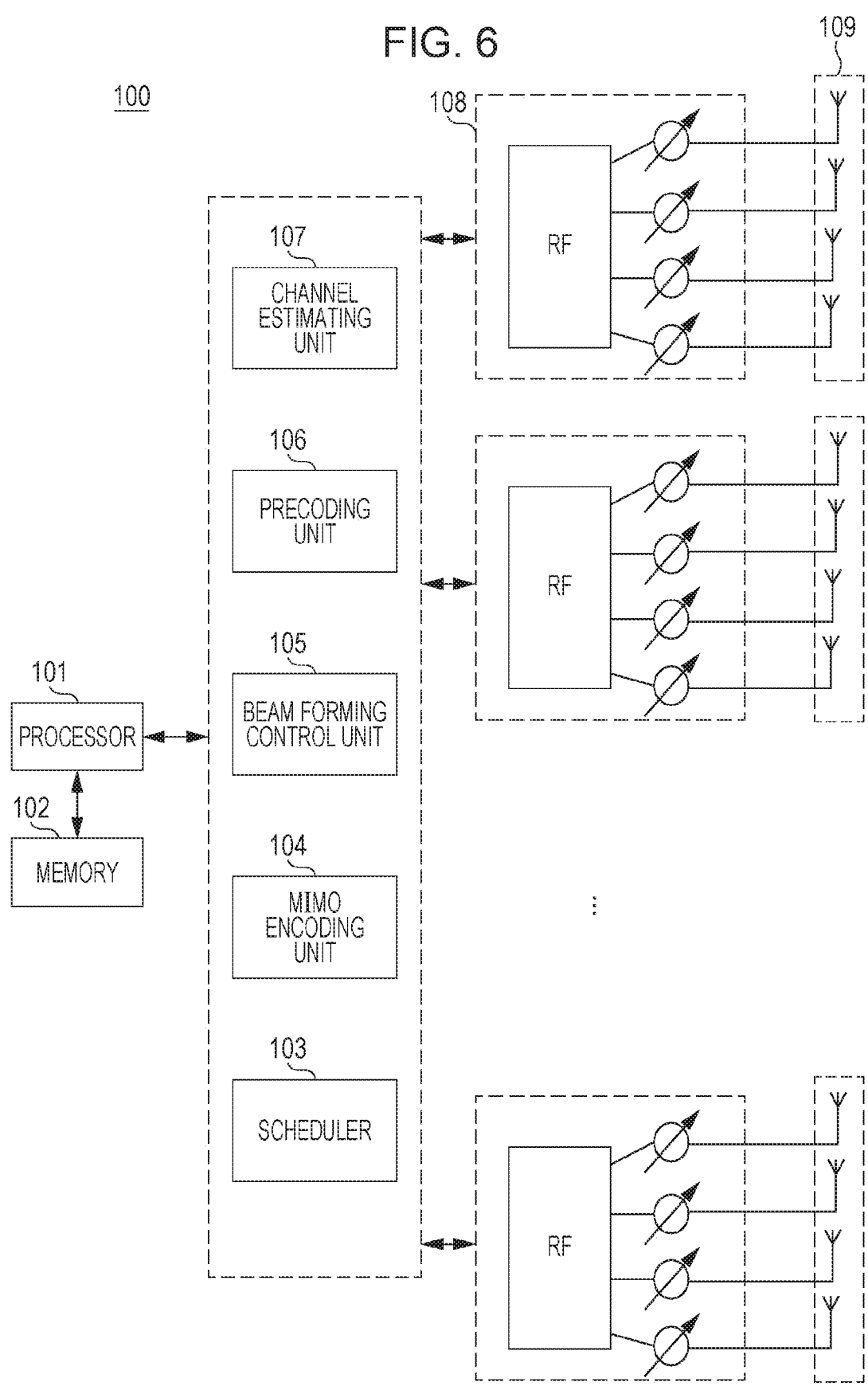
FIG. 6 is a block diagram of the configuration of a wireless device according to a first exemplary embodiment of the present disclosure.

FIG. 6 is a block diagram of the configuration of a MIMO wireless device 100 of the wireless system 50 according to the present disclosure. The wireless device 100 is capable of operating as the initiator 51 or the responder 52. The wireless device 100 includes a processor 101, a memory 102, a scheduler 103, a MIMO encoding unit 104, a beam forming control unit 105, a precoding unit 106, a channel estimating unit 107, a plurality of transmitting and receiving units 108, and a plurality of array antennas 109.

Each of the transmitting and receiving units 108 corresponds to one of the array antennas 109. In addition, each of the transmitting and receiving units 108 includes an RF module and a plurality of phase shifters. Each of the phase shifters is connected to one of antenna elements that constitute the corresponding array antenna 109.

Each of the transmitting and receiving units 108 receives an RF signal via the corresponding one of the array antennas 109 and converts the received signal into a baseband signal. Thereafter, the transmitting and receiving unit 108 outputs the baseband signal to the processor 101. In addition, the transmitting and receiving unit 108 converts a baseband signal received from the processor 101 into an RF signal and transmits the RF signal via the array antenna 109.

In addition, in each of the transmitting and receiving units 108, each of the phase shifters shifts the phase of a signal to be transmitted from the corresponding one of the antenna elements of the array antenna 109 in response to an instruction from the beam forming control unit 105 (described below). In this manner, a single antenna beam/sector formed by each of the array antennas 109 is tuned.

The processor 101 processes the received baseband signal and starts the function modules to perform a variety of processes of the wireless device 20. For example, upon performing antenna beam training (MIMO training), the processor 101 controls the processes for performing the sector level sweeping for a TX sector (transmission sector sweeping), a sector level sweeping for an RX sector (reception sector sweeping), and beam combination training.

Figure 7:
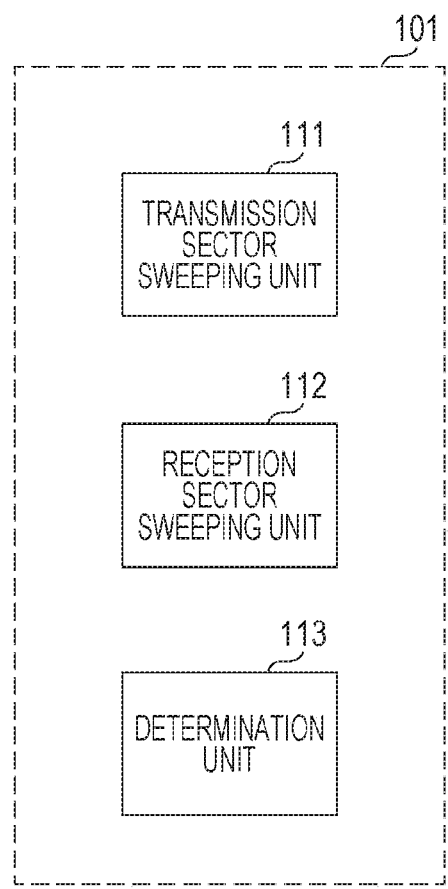
FIG. 7 is a block diagram of the internal configuration of a processor according to the first exemplary embodiment of the present disclosure.

FIG. 7 illustrates an example of component parts of the processor 101 that perform the antenna beam training. As illustrated in FIG. 7, the processor 101 includes at least a transmission sector sweeping unit 111, a reception sector sweeping unit 112, and a determination unit 113.

More specifically, the transmission sector sweeping unit 111 of the initiator 51 transmits a training packet from each of the sectors formed by one of the array antennas 109. In addition, the transmission sector sweeping unit 111 of the responder 52 selects a set of a determined number of the TX sectors for each of the plurality of the TX antennas (the array antennas 109).

The reception sector sweeping unit 112 of the initiator 51 transmits a training packet from each of the array antennas 109 set in an omni-directional antenna pattern. In addition, the reception sector sweeping unit 112 of the responder 52 selects a set of a determined number of the RX sectors for each of the RX antennas (the array antennas 109).

The determination unit 113 of the initiator 51 transmits a training packet from each of the sets of the TX sectors selected by the transmission sector sweeping unit 111 of the responder 52. In addition, from among the sets of the TX sectors and the sets of the RX sectors, the determination unit 113 of the responder 52 determines a determined number of pairs consisting of the TX sector and the RX sector used for the MIMO operation. At that time, the determination unit 113 determines the pairs so that the TX antenna that forms the TX sector and the RX antenna that forms the RX sector are not duplicate in all the pairs.

Note that a method for determining the pairs in the antenna beam training is described in more detail below.

The memory 102 stores an instruction program or data used to control the operation performed by the wireless device 20.

The scheduler 103 is responsible for scheduling allocation of transmission data to the resources (e.g., a time resource, a frequency resource, and a space resource).

The MIMO encoding unit 104 performs a MIMO encoding process on the transmission data and generates a data signal for each of the streams of MIMO transmission.

The beam forming control unit 105 adjusts the phases of the phase shifters of each of the transmitting and receiving units 108 to control a single antenna beam/sector formed by each of the array antennas 109. At that time, unlike the precoding/beam forming control unit 25 illustrated in FIG. 2 that controls a single array antenna to form a plurality of the antenna beams/sectors at a time, the beam forming control unit 105 controls each of the plurality of array antennas 109 (the phase shifters).

The precoding unit 106 performs, in a MIMO operation, a precoding process on the data signal of each of the streams using, for example, a channel estimation value estimated by the channel estimating unit 107.

The channel estimating unit 107 performs estimation of a channel between each of the antenna elements of the array antennas 109 of its own and each of the antenna elements of the array antennas of the other party of communication.

Antenna Beam Training Operation Performed by Wireless System

The antenna beam training (the MIMO training) according to the present disclosure is described below.

Figure 8:
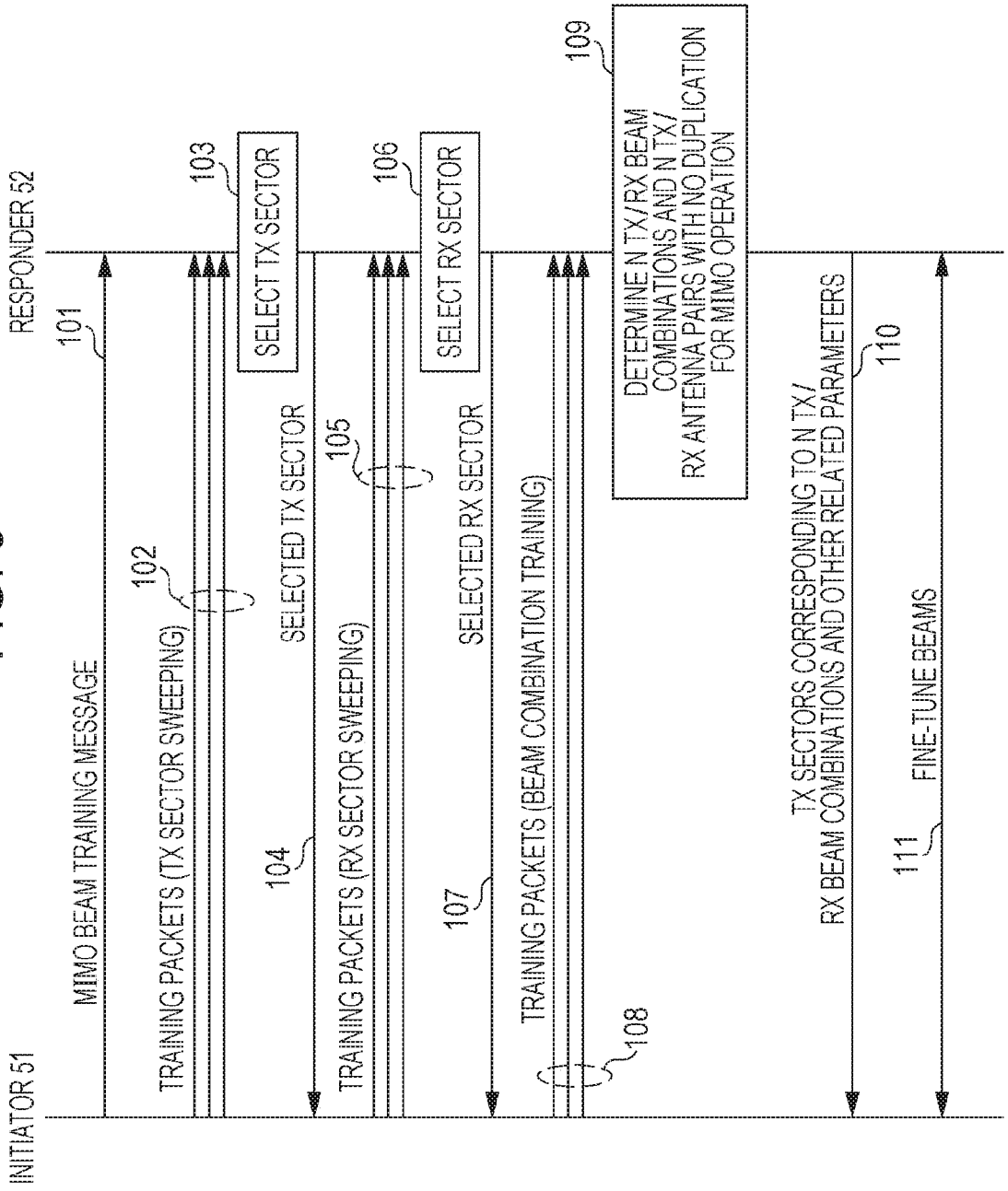
FIG. 8 is a sequence diagram of an antenna beam training process according to the first exemplary embodiment of the present disclosure.

FIG. 8 is a flowchart of the antenna beam training process for a MIMO operation performed in the wireless system 50. In FIG. 8, the initiator 51 serves as a transmitter of a MIMO signal, and the responder 52 serves as a receiver of the MIMO signal. Note that the responder 52 may serve as a transmitter of a MIMO signal, and the initiator 51 may serve as a receiver of the MIMO signal.

In step 101, the initiator 51 transmits a MIMO beam training message to the responder 52 to start a MIMO training process. The MIMO beam training message includes MIMO training parameters, such as the number of TX/RX beam combinations N to be determined in the MIMO operation. According to the present exemplary embodiment, 'N' is the same as the number of MIMO spatial streams. Alternatively, 'N' may be set to a minimum value of the number of the TX antennas and the number of the RX antennas.

Figure 9:
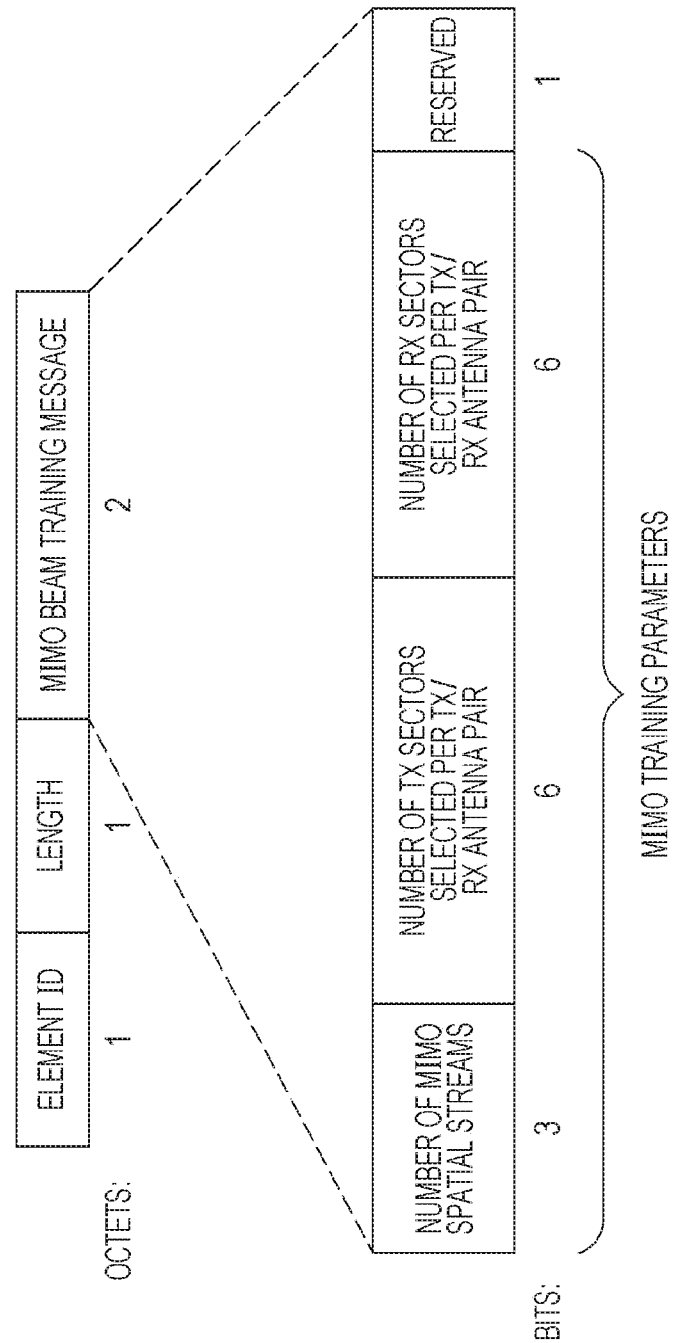
FIG. 9 illustrates an example of a frame format of a MIMO beam training message according to the first exemplary embodiment of the present disclosure.

FIG. 9 illustrates an example of the structure of a frame format used to transmit the MIMO beam training message. As illustrated in FIG. 9, Information Element (IE) for sending the MIMO beam training message (a beam training IE) is defined. The beam training IE includes a field indicating an ID to identify the IE (Element ID), a field indicating the length of the IE (Length), and a field containing the MIMO beam training message. In addition, the MIMO beam training message field illustrated in FIG. 9 includes a sub-field indicating the number of MIMO spatial streams, a sub-field indicating the number of TX sectors to be selected, the number of RX sectors to be selected, and a reserved sub-field (Reserved). The beam training IE illustrated in FIG. 9 may be included in, for example, a BRP (Beamforming Report Poll) frame and be transmitted. Note that a technique for transmitting the MIMO beam training message is not limited to the technique using the IE illustrated in FIG. 9. For example, the MIMO beam training message may be transmitted using, for example, a management frame dedicated to a MIMO beam training message.

Referring back to FIG. 8, in step 102, the TX sector sweeping is performed. More specifically, the initiator 51 transmits a plurality of training packets to the responder 52 during the TX sector sweeping. Each of the training packets has no data payload, since the other party of communication measures only the quality of a received signal (e.g., an SNR). In addition, the training packets are transmitted via all the TX sectors of all the TX antennas. The packets transmitted from each of the sectors have a transmission gap between each of consecutive training packets provided thereto. The responder 52 receives the training packets using the RX antennas each set in an omni-directional antenna pattern.

In step 103, the responder 52 records the quality of each of the received signals and selects a set of TX sectors (a candidate set) having excellent received signal quality for each of the TX antennas. The set of TX sectors is used for beam combination training that is subsequently performed.

In step 104, the responder 52 feeds back the TX sectors selected in step 103 to the initiator 51.

In step 105, RX sector sweeping is performed. More specifically, during the RX sector sweeping, the initiator 51 transmits a plurality of training packets to the responder 52 using the TX antennas each set in an omni-directional antenna pattern. The responder 52 receives the training packets via all the RX sectors of all the RX antennas.

In step 106, the responder 52 records the quality of each of the received signals and selects a set of RX sectors (a candidate set) having excellent received signal quality for each of the RX antennas. The set of RX sectors is used for beam combination training that is subsequently performed.

In step 107, the responder 52 feeds back the number of the RX sectors selected in step 106 to the initiator 51.

In step 108, the initiator 51 and the responder 52 perform beam combination training using the set of TX sectors selected in step 103 and the set of RX sectors selected in step 106. At that time, since the initiator 51 has been informed of the number of the selected RX sectors in step 107, the initiator 51 knows the number of training packets to be sent via the selected TX sectors. The responder 52 records the received signal qualities measured for all the possible TX/RX sector combinations during the beam combination training.

In step 109, the responder 52 determines N best TX/RX beam combinations for a MIMO operation and N corresponding TX/RX antenna pairs on the basis of a determined criterion. Note that the antennas that form the TX/RX antenna pairs are not duplicate in the N combinations. That is, the responder 52 determines N TX/RX antenna pairs that correspond to the N best TX/RX beam combinations and that are not duplicate.

For example, the N best TX/RX beam combinations and the corresponding N TX/RX antenna pairs with no duplication may be determined on the basis of the SNIR criterion. The SNIR for a TX/RX beam combination formed from TX sector k of TX antenna i and RX sector l of RX antenna j is given as follows:

$$\mathrm{SNIR}(i{:}k,j{:}l) = S(i{:}k,j{:}l) / [\Sigma_{m=0, m \neq i}^{N_{ant}^{(TX)}} \bar{S}(m,j{:}l) + N(j{:}l)], \quad i=0,1\ldots,N_{ant}^{(TX)}-1;$$
$$j=0,1,\ldots,N_{ant}^{(RX)}-1 \qquad (1)$$

where $N_{ant}^{(TX)}$ and $N_{ant}^{(RX)}$ are the number of TX antennas and the number of RX antennas, respectively, S(i:k, j:l) is the received signal power of a signal transmitted from TX sector k of TX antenna i and received by RX sector i of RX antenna j, $\bar{S}$(m, j:l) is the average received signal power of a signal transmitted from TX sectors of TX antenna m and received by RX sector l of RX antenna j, and N(j:l) is the noise power in RX sector l of RX antenna j.

When the SNIR is calculated for the first TX/RX sector combination, transmission using a second TX/RX sector combination is regarded as interference in a case where the following two conditions are met:

Condition 1: the RX antennas and RX sectors are the same in the first and second TX/RX sector combinations, and Condition 2: the TX antennas are different in the first and second TX/RX sector combinations.

In step 110, the responder 52 feeds back, to the initiator 51, the TX sectors corresponding to the N best TX/RX beam combinations and other related parameters. Examples of the related parameters include the received signal qualities corresponding to N TX/RX beam combinations.

In step 111, to improve the accuracy of directivity and the quality of a signal, the initiator 51 and the responder 52 perform a beam fine tuning process for fine-tuning the antenna beams.

Method for Determining TX/RX Beam Combination

Figure 10:
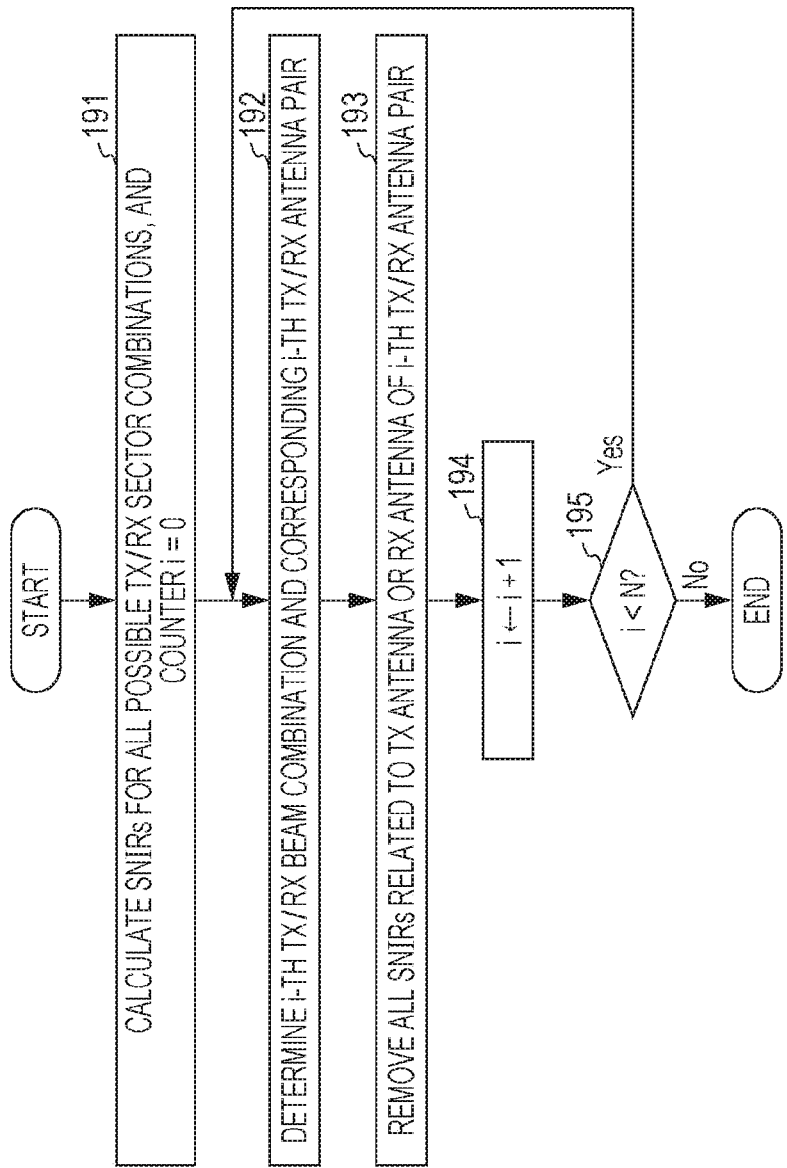
FIG. 10 is a flowchart illustrating TX/RX beam combinations and a method for determining TX/RX antenna pairs according to the first exemplary embodiment of the present disclosure.

A method for determining N best TX/RX beam combinations and the corresponding N TX/RX antenna pairs with no duplication (step 109 illustrated in FIG. 8) is described in detail below. FIG. 10 is a flowchart of the process of the determination method.

As illustrated in FIG. 10, in step 191, the responder 52 calculates the SNIRs for all the possible TX/RX sector combinations. In addition, a counter i is initialized to a value of 0.

In step 192, the responder 52 determines the TX/RX sector combination having the highest SNIR to be an i-th best TX/RX beam combination. In addition, the responder 52 determines a combination of the TX antenna and the RX antenna corresponding to the i-th best TX/RX beam combination to be an i-th TX/RX antenna pair.

In step 193, among the SNIRs selected in step 191, the responder 52 removes all the SNIRs related to the TX antenna and the RX antenna included in the i-th TX/RX antenna pair from selection in the subsequent TX/RX beam combination determination processes.

In step 194, the counter i is incremented by one.

In step 195, in a case where the counter i is less than N, the processing performed by the responder 52 returns to step 192. However, in a case where the counter i is N or greater, the processing is completed.

In this manner, according to the present exemplary embodiment, the N best TX/RX beam combinations for a MIMO operation may reliably contain TX/RX antenna pairs with no duplication. As a result, the wireless system 50 illustrated in FIG. 5 may normally perform the MIMO operation.

Particular Example of Determination of TX/RX Beam Combination

FIGS. 11, 12, 13A, and 13B illustrate a particular example of determination of a TX/RX beam combination. In FIGS. 11, 12, 13A, and 13B, each of the number of TX antennas and the number of RX antennas is set to 4, and the number of sectors (the number of antenna patterns) of each of the antennas is set to 16.

Figure 11:
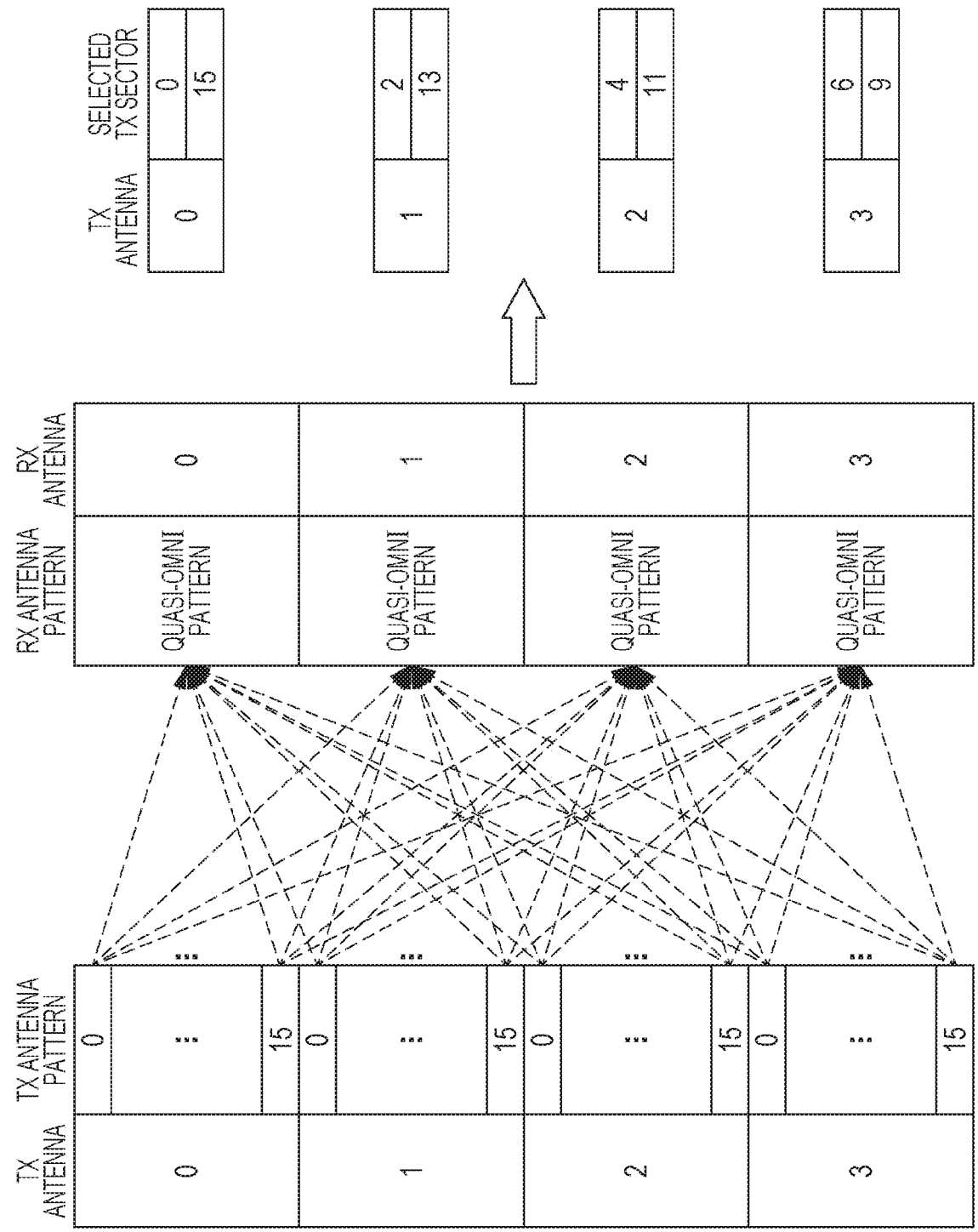
FIG. 11 illustrates an example of a TX sector sweeping process according to the first exemplary embodiment of the present disclosure.

FIG. 11 illustrates a particular example of the TX sector sweeping process according to the present exemplary embodiment. As illustrated in FIG. 11, the initiator 51 transmits training packets via 16 TX sectors (TX antenna patterns) of each of TX antennas 0 to 3.

In addition, as illustrated in FIG. 11, the responder 52 receives the training packets using the 4 RX antennas each set in the omni-directional antenna pattern (a quasi-omni pattern). Thereafter, the responder 52 selects 2 TX sectors each having excellent received signal quality for each of the TX antennas. For example, in FIG. 11, the responder 52 selects TX sectors 0 and 15 of TX antenna 0, selects TX sectors 2 and 13 of TX antenna 1, selects TX sectors 4 and 11 of TX antenna 2, and selects TX sectors 6 and 9 of TX antenna 3. Note that the responder 52 may be informed of the number of TX sectors to be selected for each of the TX antennas using the MIMO beam training message, or the responder 52 may determine the number of TX sectors.

Figure 12:
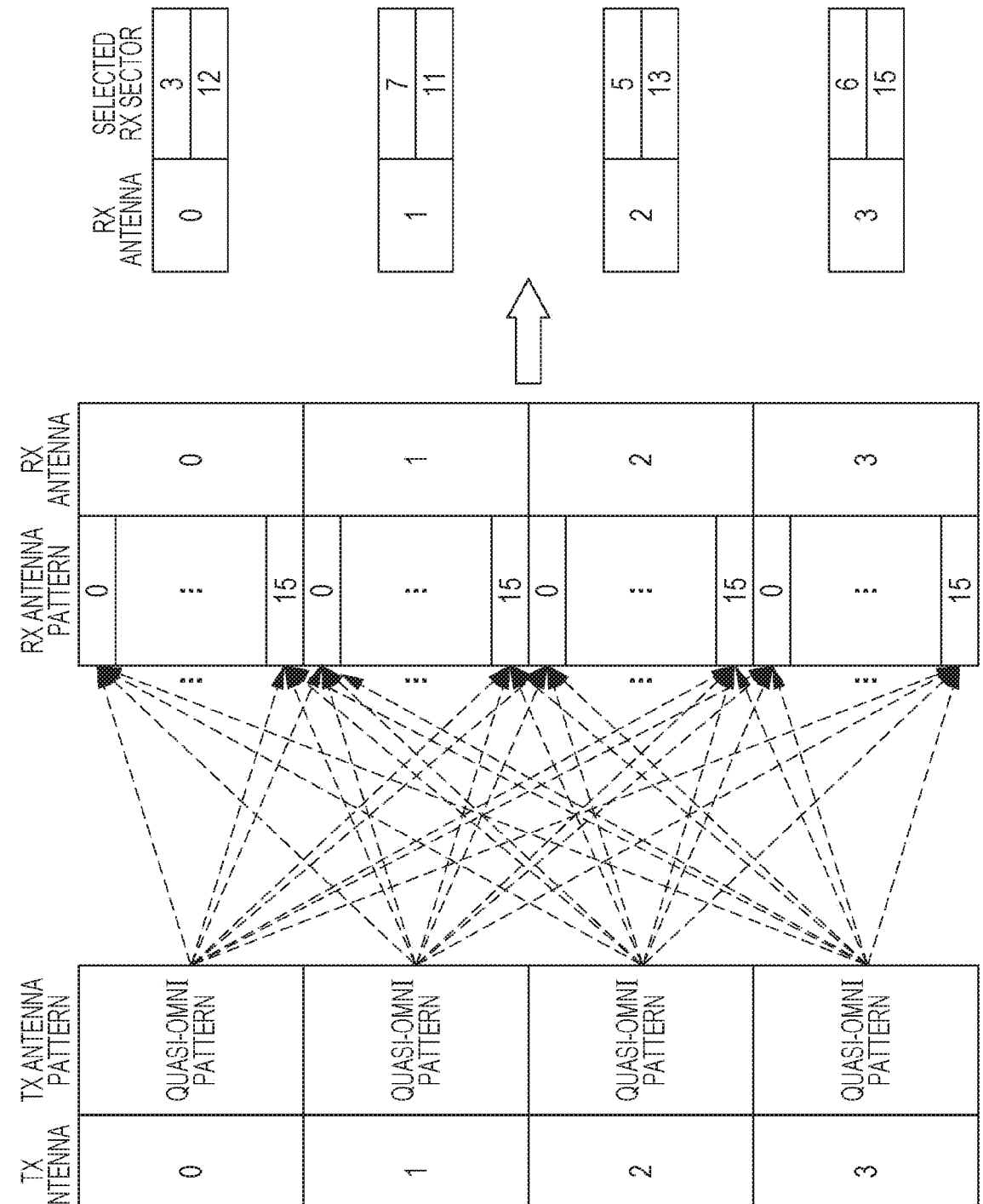
FIG. 12 illustrates an example of an RX sector sweeping process according to the first exemplary embodiment of the present disclosure.

FIG. 12 illustrates a particular example of the RX sector sweeping process according to the present exemplary embodiment. As illustrated in FIG. 12, the initiator 51 transmits training packets from each of 4 TX antennas set in an omni-directional antenna pattern.

In addition, as illustrated in FIG. 12, the responder 52 receives the training packets via 16 RX sectors (RX antenna patterns) of each of the RX antennas 0 to 3. Thereafter, the responder 52 selects 2 RX sectors each having excellent received signal quality for each of the RX antennas. For example, in FIG. 12, the responder 52 selects RX sectors 3 and 12 of RX antenna 0, selects RX sectors 7 and 11 of RX antenna 1, selects RX sectors 5 and 13 of RX antenna 2, and selects RX sectors 6 and 15 of RX antenna 3. Note that the responder 52 may be informed of the number of RX sectors to be selected for each of the RX antennas using the MIMO beam training message, or the responder 52 may determine the number of RX sectors.

Figure 13A:
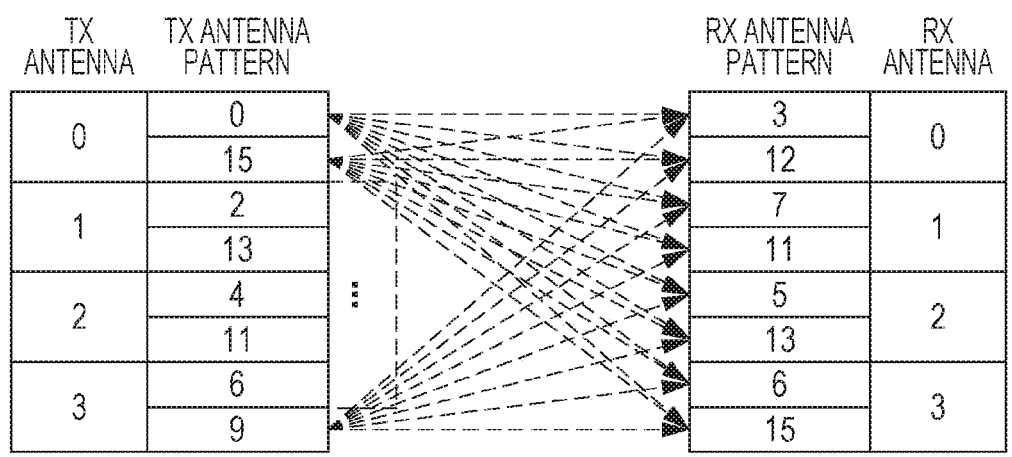
FIG. 13A illustrates an example of beam combination training according to the first exemplary embodiment of the present disclosure.

FIG. 13A illustrates a particular example of the beam combination training. The initiator 51 transmits training packets via the TX sectors selected in the TX sector sweeping (refer to FIG. 11), and the responder 52 receives the training packets via the RX sectors selected in the RX sector sweeping (refer to FIG. 12). Thereafter, the responder 52 calculates the SNIR for each of all the possible TX/RX sector combinations using, for example, Equation (1). For example, as illustrated in FIG. 13A, the responder 52 calculates the SNIR for each of 64 possible TX/RX sector combinations formed from the selected 8 TX sectors and 8 RX sectors. The results are illustrated in FIG. 13B.

Subsequently, the responder 52 determines N best TX/RX beam combinations and N corresponding TX/RX antenna pairs. In FIG. 13B, N=4. Note that the responder 52 may be informed of the number N using the MIMO beam training message.

For example, in FIG. 13B, assume that among the 64 SNIRs, $SNIR_{0:15,1:7}$ for the combination (TX sector 15 of TX antenna 0, RX sector 7 of RX antenna 1) is the highest. In such a case, the responder 52 determines the combination (TX sector 15 of TX antenna 0, RX sector 7 of RX antenna 1) to be the first best TX/RX beam combination and the corresponding TX/RX antenna pair.

In addition, the responder 52 removes all the SNIRs related to TX antenna 0 and RX antenna 1 from selection in the subsequent TX/RX beam combination determination processes. That is, selection is made from among the SNIRs related to TX antennas 1, 2, and 3 and RX antennas 0, 2, and 3. The responder 52 determines the second best TX/RX beam combination from among the SNIRs from which certain SNIRs have been removed. The responder 52 performs a similar process to determine the third and fourth best TX/RX beam combinations.

In this manner, in FIG. 13B, the following combinations are used for the MIMO operation: TX sector 15 of TX antenna 0 and RX sector 7 of RX antenna 1, TX sector 13 of TX antenna 1 and RX sector 3 of RX antenna 0, TX sector 4 of TX antenna 2 and RX sector 6 of RX antenna 3, and TX sector 6 of TX antenna 3 and RX sector 5 of RX antenna 2.

In this away, the TX antennas and the RX antennas corresponding to the sectors selected as the best TX/RX beam combinations are not selected as the TX antennas/RX antennas corresponding to the other best TX/RX beam combinations. That is, the TX antennas or the RX antennas are not duplicate in the N best TX/RX beam combinations.

Flow of Antenna Beam Training Process

FIG. 14 is a flowchart of the antenna beam training process for a MIMO operation performed by the wireless system 50 according to the present exemplary embodiment. Note that in FIG. 14, processes similar to those based on existing technology (FIG. 3) are identified with the same reference numerals, and description of the processes are not repeated.

In step 201, the responder 52 feeds back, to the initiator 51, the number of the RX sectors selected in step 4.

In step 202, the initiator 51 and the responder 52 perform the beam combination training using the set of TX sectors selected in step 2 and the set of RX sectors selected in step 4. The responder 52 determines N best TX/RX beam combinations for the MIMO operation and the corresponding N TX/RX antenna pairs with no duplication on the basis of a determined criterion (e.g., the SNIR).

In step 203, the responder 52 feeds back, to the initiator 51, the TX sectors corresponding to the N best TX/RX beam combinations determined in step 202 and the other related parameters.

In this manner, according to the present exemplary embodiment, when selecting a plurality of TX/RX antenna pairs each having excellent received signal quality in the antenna beam training for the MIMO operation, the responder 52 removes the TX antenna and the RX antenna that form an already selected TX/RX antenna pair from the selection subsequently performed. Thus, in a determined number (N) of best TX/RX antenna pairs used for the MIMO operation, the TX antennas and the RX antennas that form the pairs are not duplicate. That is, each of the TX antennas and each of the RX antenna are contained in any one of the selected TX/RX antenna pairs (the TX/RX beam combination), allowing a MIMO operation using one of the TX antennas and one of the RX antennas that form a single antenna beam/sector at a time.

As described above, according to the present exemplary embodiment, a wireless device including a plurality of array antennas may appropriately determine the best TX/RX beam combination and normally perform a MIMO operation.

While the present exemplary embodiment has been described with reference to use of the wireless device 100, the configuration of the wireless device is not limited to the configuration of the wireless device 100. For example, FIG. 15 is a block diagram of the configuration of another MIMO wireless device 100a of the wireless system 50. Note that in the wireless device 100a illustrated in FIG. 15, a component part that performs a process the same as that of the wireless device 20 (FIG. 2) or the wireless device 100 (FIG. 6) is identified with the same reference numeral, and description of the component part is not repeated. The wireless device 100a may operate to serve as either the initiator 51 or the responder 52.

In the wireless device 100, each of the transmitting and receiving units 108 corresponding to one of the array antennas 109 is provided with one RF module. In contrast, in the wireless device 100a, each of transmitting and receiving units 108a corresponding to one of the array antennas 109 is provided with transceivers each connected to one of the antenna elements. Each of the transceivers includes an RF module.

In addition, in the wireless device 20, the precoding/beam forming control unit 25 performs control so that a plurality of antenna beams/sectors are formed for each of the array antennas at a time. In contrast, in the wireless device 100a, a precoding/beamforming control unit 25a performs control so that a single antenna beam/sector is formed for each of the array antennas 109.

Even when the wireless device 100a is used, MIMO antenna beam training may be performed in the same manner as in the above-described exemplary embodiment and, thus, a MIMO operation may be normally performed.

Second Exemplary Embodiment

Since the basic configurations of a system and a wireless device according to the present exemplary embodiment are the same as those of the first exemplary embodiment, description is given with reference to FIG. 5 (the wireless system 50) and FIG. 6 (the wireless device 100).

Note that according to the present exemplary embodiment, the transmission sector sweeping unit 111, the reception sector sweeping unit 112, and the determination unit 113 of the processor 101 of FIG. 7 operate differently from those of FIGS. 5 and 6.

More specifically, according to the present exemplary embodiment, the transmission sector sweeping unit 111 of the responder 52 determines, from among a plurality of TX antennas and a plurality of RX antennas, a determined number of antenna pairs each transmitting and receiving one of streams in a MIMO operation. At that time, the transmission sector sweeping unit 111 determines the antenna pairs so that the TX antennas and the RX antennas that form the antenna pairs are not duplicate in all the antenna pairs. In addition, like the first exemplary embodiment, the transmission sector sweeping unit 111 selects a set of a determined number of the TX sectors for each of the TX antennas.

The reception sector sweeping unit 112 of the responder 52 selects a set of a determined number of the RX sectors for each of the determined antenna pairs. That is, the reception sector sweeping unit 112 of the initiator 51 transmits training packets for the RX antenna from the TX antenna in each of the antenna pairs.

The determination unit 113 of the responder 52 selects, for each of the antenna pairs, a pair consisting of a TX sector and an RX sector used for a MIMO operation from among the set of TX sectors and the set of RX sectors to determine a determined number of pairs. That is, the determination unit 113 of the initiator 51 transmits the training packets from the set of TX sectors to the set of RX sectors selected for each of the antenna pairs.

FIG. 16 is a flowchart of an antenna beam training process for a MIMO operation performed by the wireless system 50 according to the present exemplary embodiment. Note that in FIG. 16, processes similar to those of the first exemplary embodiment (FIG. 8) are identified with the same reference numerals, and descriptions of the processes are not repeated.

As illustrated in FIG. 16, in step 301, the responder 52 determines N TX/RX antenna pairs with no duplication on the basis of a determined criterion. For example, the responder 52 may determine N TX/RX antenna pairs on the basis of an SNIR criterion. For example, the SNIR for a TX/RX antenna pair formed from TX antenna i and RX antenna j is given as follows:

$$\text{SNIR}(i,j) = \overline{S}(i,j) / [\Sigma_{m=0, m \neq i}^{N_{ant}^{(TX)}} \overline{S}(m,j) + N(j;l)], i=0,1 \ldots, N_{ant}^{(TX)}-1; j=0,1, \ldots, N_{ant}^{(RX)}-1 \quad (2)$$

where $\overline{S}(i, j)$ is the average received signal power of a signal transmitted from a TX sector of TX antenna i and received by RX antenna j, and $N(j)$ is the average noise power in RX antenna j. When the SNIR is calculated for a given TX/RX antenna pair, transmission from another TX/RX antenna pair including the same RX antenna and a different TX antenna is regarded as interference.

In step 302, the responder 52 selects a set of TX sectors (a candidate) for each of the TX/RX antenna pairs determined in step 301. The set of TX sectors is used in a beam combination training process subsequently performed.

In step 303, the responder 52 feeds back, to the initiator 51, the TX sectors for each of the TX/RX antenna pairs selected in step 302.

In step 304, RX sector sweeping is performed for each of the TX/RX antenna pairs. More specifically, during the RX sector sweeping, the initiator 51 transmits a plurality of training packets to the responder 52 using the TX antennas each set in an omni-directional antenna pattern. The responder 52 receives the training packets via all the RX sectors of each of the RX antennas that forms a TX/RX antenna pair with one of the TX antennas.

In step 305, the responder 52 records the quality of each of the received signals and selects a set of RX sectors (a candidate) having excellent received signal quality for each of the TX/RX antenna pairs. The set of RX sectors is used in beam combination training subsequently performed.

In step 306, the responder 52 feeds back, to the initiator 51, the number of the RX sectors for each of the TX/RX antenna pairs selected in step 304.

In step 307, the initiator 51 and the responder 52 perform the beam combination training using the set of TX sectors selected in step 302 and the set of RX sectors selected in step 305. Note that since the initiator 51 is informed of the number of the selected RX sectors in step 306, the initiator 51 knows the number of training packets to be transmitted via each of the selected TX sectors. The responder 52 records the received signal quality for each of the TX/RX antenna pairs.

In step 308, the responder 52 determines the best TX/RX beam combination for each of the TX/RX antenna pairs (i.e., N best TX/RX beam combinations) on the basis of a determined criterion. Note that there is no duplication of the antennas that form the TX/RX antenna pairs. That is, the responder 52 determines N TX/RX antenna pairs with no duplication corresponding to the N best TX/RX beam combinations.

Method for Determining TX/RX Antenna Pair with No Duplication

A method for determining N TX/RX antenna pairs with no duplication (step 301 in FIG. 16) is described in detail below. FIG. 17 is a flowchart of the process of the determination method.

As illustrated in FIG. 17, in step 311, the responder 52 calculates the SNIRs for all the possible TX/RX antenna combinations. In addition, a counter i is initialized to a value of 0.

In step 312, the responder 52 determines a TX/RX antenna combination having the highest SNIR to be the i-th TX/RX antenna pair with no duplication.

In step 313, among the SNIRs calculated in step 311, the responder 52 removes all the SNIRs related to the TX antenna and the RX antenna included in the i-th TX/RX antenna pair from the selection in the subsequent TX/RX antenna pair determination processes.

In step 314, the counter i is incremented by one.

In step 315, in a case where the counter i is less than N, the processing performed by the responder 52 returns to step 312. However, in a case where the counter i is N or greater, the processing is completed.

In this manner, according to the present exemplary embodiment, in the N TX/RX antenna pairs for an MIMO operation, duplication of the TX antennas and the RX antennas may be reliably eliminated. As a result, the wireless system 50 illustrated in FIG. 5 may normally perform a MIMO operation.

Particular Example of Determination of TX/RX Antenna Pair

FIGS. 18 to 20 and FIGS. 21A and 21B illustrate a particular example of determination of a TX/RX antenna pair. Note that in FIGS. 18 to 20 and FIGS. 21A and 21B, each of the number of the TX antennas and the number of the RX antennas is set to 4, and the number of sectors of each of the antennas (the number of antenna patterns) is set to 16.

Figure 18:
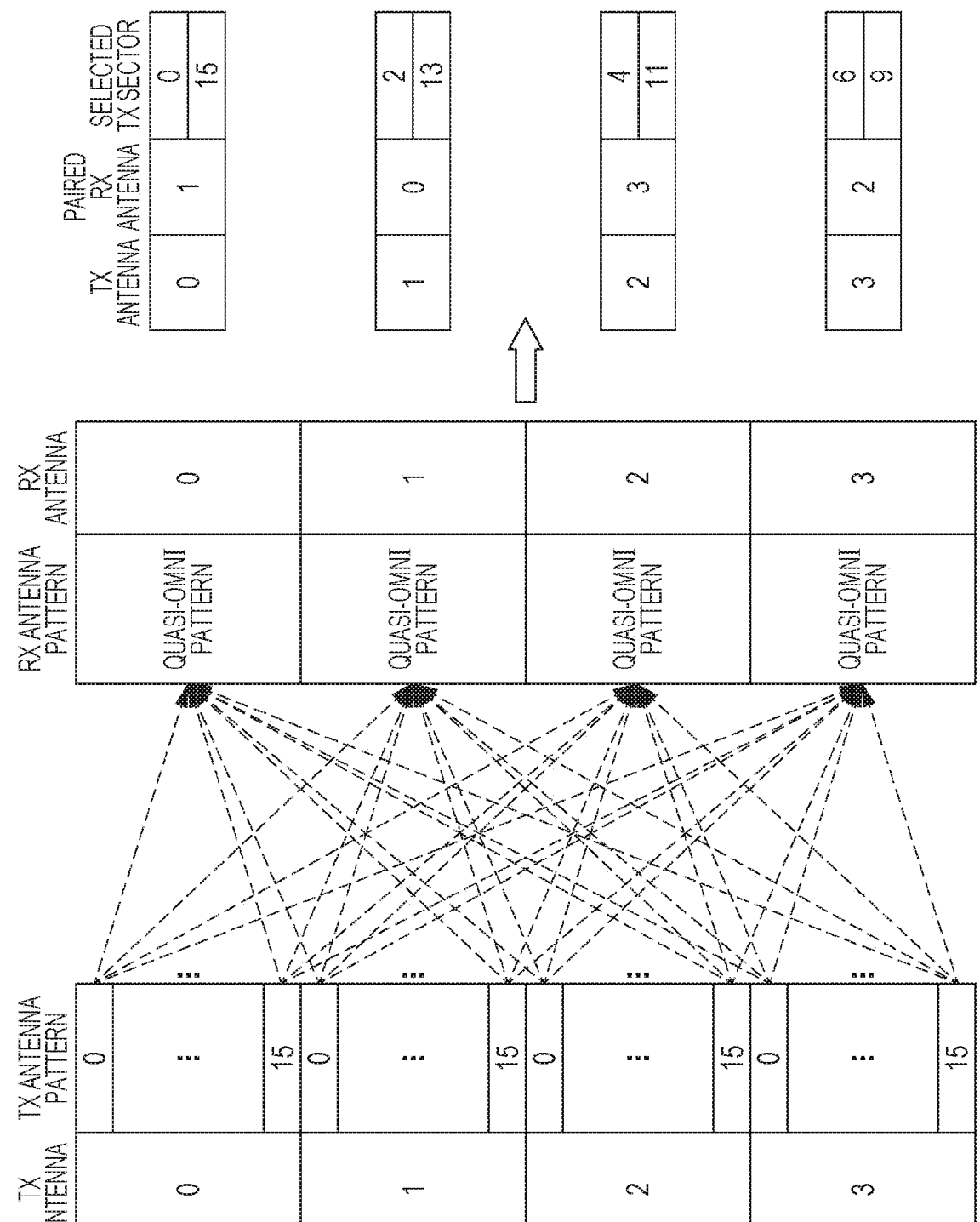
FIG. 18 illustrates an example of a TX sector sweeping process according to the second exemplary embodiment of the present disclosure.

FIG. 18 illustrates a particular example of a TX sector sweeping process according to the present exemplary embodiment. As illustrated in FIG. 18, the initiator 51 transmits training packets via 16 TX sectors (TX antenna patterns) of each of TX antennas 0 to 3.

In addition, as illustrated in FIG. 18, the responder 52 receives the training packets using the 4 RX antennas each set in an omni-directional antenna pattern. Thereafter, as illustrated in FIG. 19, the responder 52 calculates the SNIRs for all the 16 TX/RX antenna combinations using Equation (2). Thereafter, the responder 52 determines 4 TX/RX antenna pairs with no duplication in accordance with the determination method illustrated in FIG. 17. For example, in FIGS. 18 and 19, the responder 52 determines a pair consisting of TX antenna 0 and RX antenna 1, a pair consisting of TX antenna 1 and RX antenna 0, a pair consisting of TX antenna 2 and RX antenna 3, and a pair consisting of TX antenna 3 and RX antenna 2. Note that the number of TX/RX antenna pairs is the same as the number of the best TX/RX beam combinations received using the MIMO beam training message.

Subsequently, the responder 52 selects 2 TX sectors for each of the TX/RX antenna pairs on the basis of the received signal qualities (the SNIRs). For example, in FIG. 18, the responder 52 selects TX sectors 0 and 15 for the pair consisting of TX antenna 0 and RX antenna 1, selects TX sectors 2 and 13 for the pair consisting of TX antenna 1 and RX antenna 0, selects TX sectors 4 and 11 for the pair consisting of TX antenna 2 and RX antenna 3, and selects TX sectors 6 and 9 for the pair consisting of TX antenna 3 and RX antenna 2. Note that the responder 52 may be informed of the number of TX sectors to be selected for each of the TX antennas using the MIMO beam training message, or the responder 52 may determine the number of TX sectors.

Figure 20:
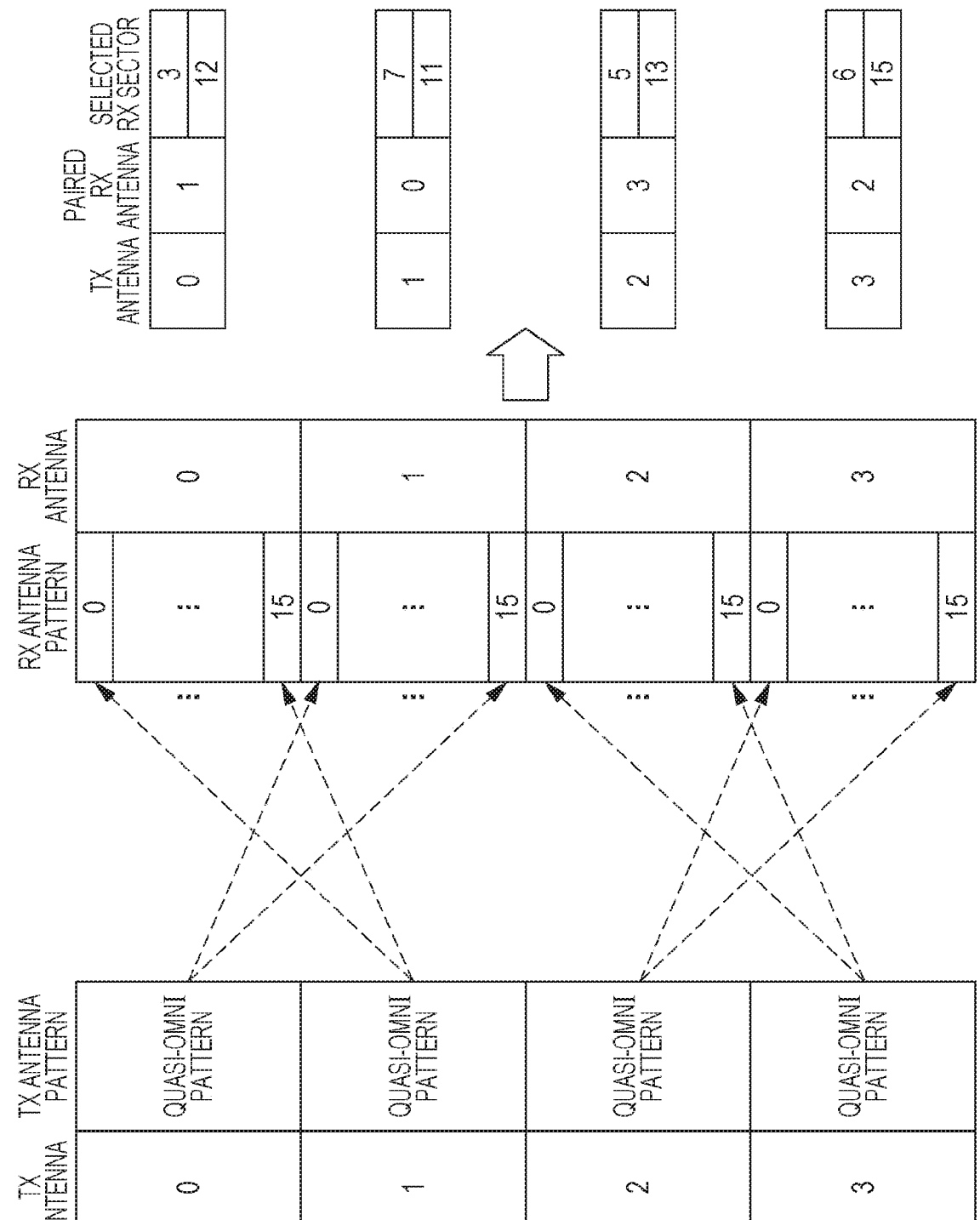
FIG. 20 illustrates an example of an RX sector sweeping process according to the second exemplary embodiment of the present disclosure.

FIG. 20 illustrates a particular example of the RX sector sweeping process according to the present exemplary embodiment. As illustrated in FIG. 20, the initiator 51 transmits a training packet to each of the TX/RX antenna pairs via the TX antenna set in an omni-directional antenna pattern.

In addition, as illustrated in FIG. 20, the responder 52 receives the training packets via 16 RX sectors (RX antenna patterns) of each of RX antennas that forms a pair with one of the TX antennas. For example, in FIG. 20, the responder 52 receives the training packet transmitted from the TX antenna 0 via RX sectors 0 to 15 of RX antenna 1 which forms a pair with the TX antenna 0. Similarly, the responder 52 receives the training packet transmitted from TX antenna 1 via RX sectors 0 to 15 of the RX antenna 0 which forms a pair with the TX antenna 1. A similar operation is performed for the TX antennas 2 and 3 and the RX antennas 2 and 3.

Subsequently, the responder 52 selects 2 RX sectors each having the excellent received signal quality for each of the RX antennas that forms a pair with one of the TX antennas. For example, in FIG. 20, the responder 52 selects RX sectors 3 and 12 for the pair consisting of TX antenna 0 and RX antenna 1, selects RX sectors 7 and 11 for the pair consisting of TX antenna 1 and RX antenna 0, selects RX sectors 5 and 13 for the pair consisting of TX antenna 2 and RX antenna 3, and selects RX sectors 6 and 15 for the pair consisting of TX antenna 3 and RX antenna 2. Note that the responder 52 may be informed of the number of RX sectors to be selected for each of the RX antennas using the MIMO beam training message, or the responder 52 may determine the number of RX sectors.

Figure 21A:
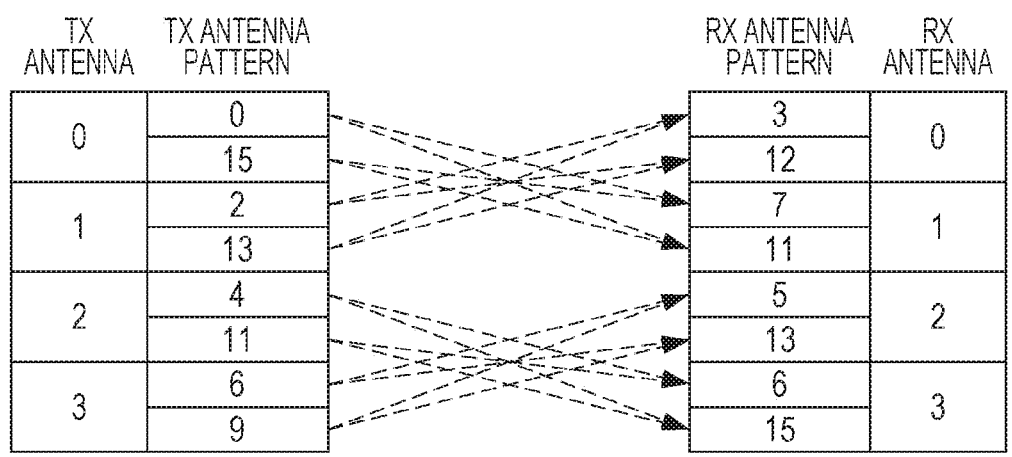
FIG. 21A illustrates an example of beam combination training according to the second exemplary embodiment of the present disclosure.

FIG. 21A illustrates a particular example of the beam combination training according to the present exemplary embodiment. The initiator 51 transmits, to the 4 TX/RX antenna pairs, training packets via the TX sectors selected in the TX sector sweeping (refer to FIG. 18), and the responder 52 receives the training packets via the RX sectors selected in the RX sector sweeping (refer to FIG. 20). For example, the initiator 51 transmits the training packets to the TX/RX antenna pair consisting of TX antenna 0 and RX antenna 1 via TX sectors 0 and 15 of the TX antenna, and the responder 52 receives the training packets via RX sectors 7 and 11 of the RX antenna 1. A similar operation is performed for the other TX/RX antenna pairs.

Thereafter, the responder 52 calculates the SNIR for each of all the possible TX/RX sector combinations for each of the TX/RX antenna pairs using, for example, Equation (1). For example, as illustrated in FIG. 21A, the responder 52 calculates the SNIR for each of all the 4 possible TX/RX sector combinations of the 2 TX sectors and 2 RX sectors selected for each of the TX/RX antenna pairs (i.e., 16 combinations in total). The calculated SNIRs are illustrated in FIG. 21B.

Subsequently, the responder 52 determines the best TX/RX beam combination for each of the TX/RX antenna pairs. For example, in FIG. 21B, the following combinations are determined as the best TX/RX beam combinations: TX sector 15 of TX antenna 0 and RX sector 7 of RX antenna 1, TX sector 13 of TX antenna 1 and RX sector 3 of RX antenna 0, TX sector 4 of TX antenna 2 and RX sector 6 of RX antenna 3, and TX sector 6 of TX antenna 3 and RX sector 5 of RX antenna 2.

A comparison of the RX sector sweeping process according to the present exemplary embodiment (FIG. 20) and the RX sector sweeping process according to the first exemplary embodiment (FIG. 12) is discussed below. According to the first exemplary embodiment, the sweeping process is performed on all the RX sectors of all the RX antennas for each of the TX antennas. In contrast, according to the present exemplary embodiment, the sweeping process is performed on all the RX sectors of each of RX antennas that forms a pair with one of the TX antennas. That is, according to the present exemplary embodiment, the throughput of the RX sector sweeping process may be increased more than in the first exemplary embodiment.

In addition, a comparison of the beam combination training according to the present exemplary embodiment (FIGS. 21A and 21B) and the beam combination training according to the first exemplary embodiment (FIGS. 13A and 13B) is discussed below. According to the first exemplary embodiment, a selection process is performed on all the combinations of the TX sectors selected through the TX sector sweeping and the RX sectors selected through the RX sector sweeping using the SNIRs. In contrast, according to the present exemplary embodiment, a selection process is performed on the selected combinations of the TX sectors and the RX sectors in the TX/RX antenna pairs using the SNIRs. That is, according to the present exemplary embodiment, the throughput of the beam combination training may be increased more than in the first exemplary embodiment.

Flow of Antenna Beam Training Process

Figure 22:
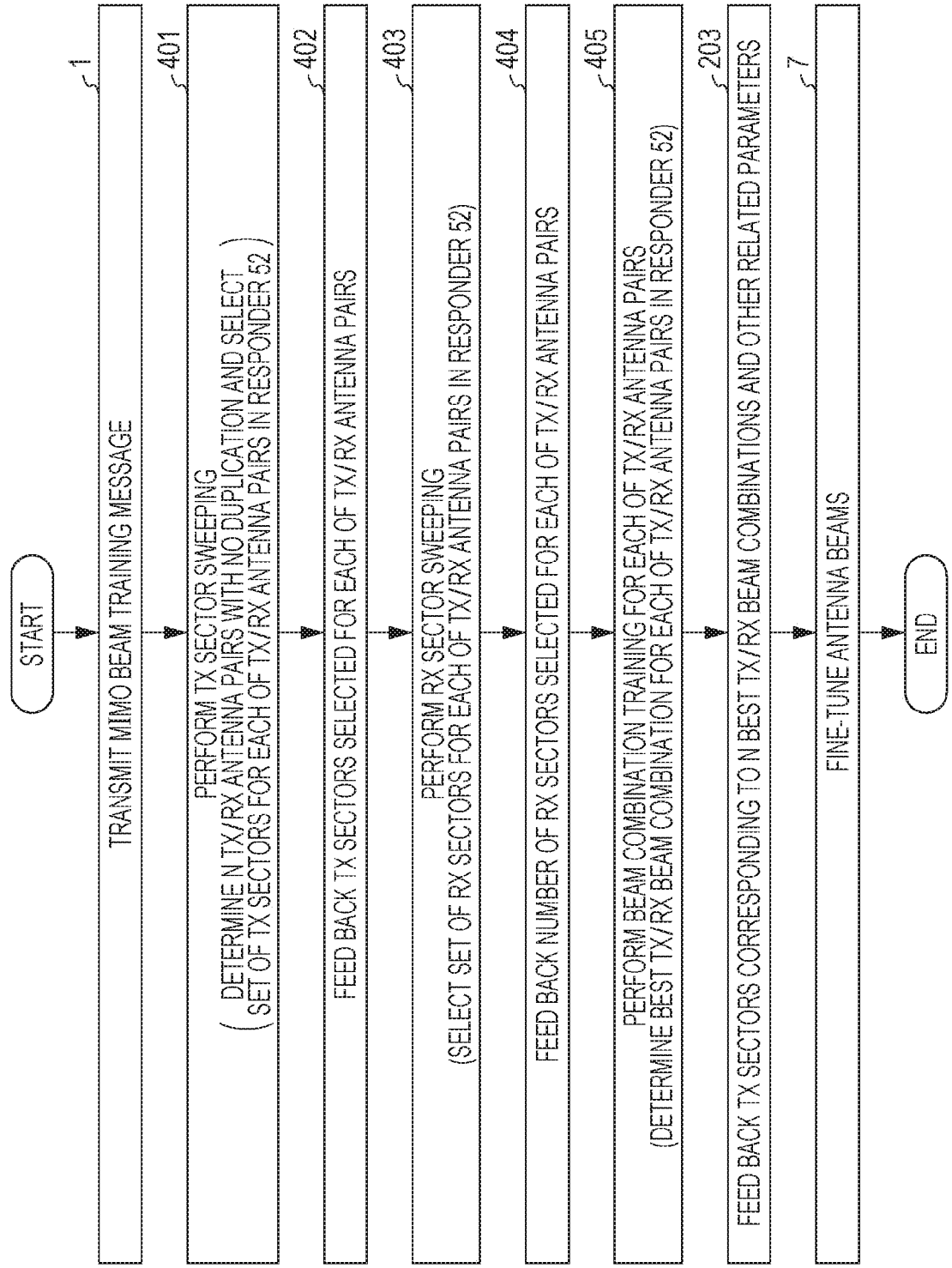
FIG. 22 is a flowchart of the antenna beam training process according to the second exemplary embodiment of the present disclosure.

FIG. 22 is a flowchart of the antenna beam training process for a MIMO operation performed by the wireless system 50 according to the present exemplary embodiment. Note that in FIG. 22, processes similar to those based on existing technology (FIG. 3) or those of the first exemplary embodiment (FIG. 14) are identified with the same reference numerals, and description of the processes are not repeated.

In step 401, the TX sector sweeping is performed. More specifically, the initiator 51 transmits a plurality of training packets via all the sectors of the TX antennas. The responder 52 receives the training packets using the RX antennas each set in an omni-directional antenna pattern. Thereafter, the responder 52 determines N TX/RX antenna pairs with no duplication. In addition, the responder 52 selects a set of TX sectors having excellent received signal quality for each of the TX/RX antenna pairs.

In step 402, the responder 52 feeds back, to the initiator 51, the TX sector of each of the TX/RX antenna pairs selected in step 401.

In step 403, the RX sector sweeping is performed. More specifically, the initiator 51 transmits a plurality of training packets to each of the N TX/RX antenna pairs using the TX antenna set in an omni-directional antenna pattern. The responder 52 receives the plurality of training packets via all the sectors of the RX antenna that forms a pair with the TX antenna. The responder 52 selects a set of the RX sectors having excellent received signal quality for each of the TX/RX pairs.

In step 404, the responder 52 feeds back, to the initiator 51, the number of the RX sectors for each of the TX/RX antenna pairs selected in step 403.

In step 405, the initiator 51 and the responder 52 perform the beam combination training using the set of TX sectors selected in step 401 and the set of RX sectors selected in step 403. The responder 52 determines N best TX/RX beam combinations for a MIMO operation on the basis of the received signal qualities.

In this manner, according to the present exemplary embodiment, when selecting a plurality of TX/RX antenna pairs each having excellent received signal quality during the TX sector sweeping, the responder 52 removes the TX antenna and the RX antenna that form an already selected TX/RX antenna pair from the selection subsequent performed. Thus, in the TX/RX antenna pairs, the TX antennas and the RX antennas that form a determined number (N) of best TX/RX antenna pairs used for the MIMO operation are not duplicate. As a result, a MIMO operation using the TX antennas and the RX antennas that form a single antenna beam/sector at a time may be performed.

As described above, like the first exemplary embodiment, according to the present exemplary embodiment, the wireless device including a plurality of array antennas may appropriately determine the best TX/RX beam combination and normally perform a MIMO operation.

In addition, a comparison of the first exemplary embodiment (FIG. 8) and the present exemplary embodiment (FIG. 16) is discussed below. According to the first exemplary embodiment, the N best TX/RX beam combinations and the corresponding TX/RX antenna pairs are determined in the same phase (the beam combination training). In contrast, according to the present exemplary embodiment, the determination is made in different phases (i.e., the TX sector sweeping and the beam combination training). According to the present exemplary embodiment, the TX/RX antenna pairs with no duplication are determined during the TX sector sweeping, and the subsequent processes (i.e., the RX sector sweeping and the beam combination training) are performed for each of the determined TX/RX antenna pairs. That is, the best TX/RX beam combination is determined for each of the N TX/RX antenna pairs with no duplication. In this way, unlike the first exemplary embodiment, the number of training packets or the SNIR calculation processes may be kept to minimum necessary in the RX sector sweeping and the beam combination training. Thus, the speed of beam training for a MIMO operation may be increased.

Third Exemplary Embodiment

Since the basic configurations of a system and a wireless device according to the present exemplary embodiment are the same as those of the first exemplary embodiment, the following description is given with reference to FIG. 5 (the wireless system 50) and FIG. 6 (the wireless device 100).

Note that according to the present exemplary embodiment, a processor 101 (not illustrated) is formed by removing the determination unit 113 from the processor 101 illustrated in FIG. 7 so as to include the transmission sector sweeping unit 111 and the reception sector sweeping unit 112. The operation performed by the transmission sector sweeping unit 111 is the same as in the second exemplary embodiment. The operation performed by the reception sector sweeping unit 112 differs from that in each of the first and second exemplary embodiments.

More specifically, like the second exemplary embodiment, the transmission sector sweeping unit 111 of the responder 52 according to the present exemplary embodiment determines, from among a plurality of TX antennas and a plurality of RX antennas, a determined number of antenna pairs that transmit and receive streams for a MIMO operation. At that time, the transmission sector sweeping unit 111 determines the antenna pairs so that the TX antennas and the RX antennas are not duplicate in all the antenna pairs. In addition, like the first exemplary embodiment, the transmission sector sweeping unit 111 selects a set of a determined number of the TX sectors for each of the plurality of TX antennas.

The reception sector sweeping unit 112 selects a pair consisting of TX sector and RX sector used for a MIMO operation from the set of the TX sectors selected by the transmission sector sweeping unit 111 and a plurality of the RX sectors of the RX antenna for each of the antenna pairs to determine a determined number of pairs. That is, the reception sector sweeping unit 112 of the initiator 51 transmits the training packets from the set of TX sectors to all the RX sectors of each of the antenna pairs.

Figure 23:
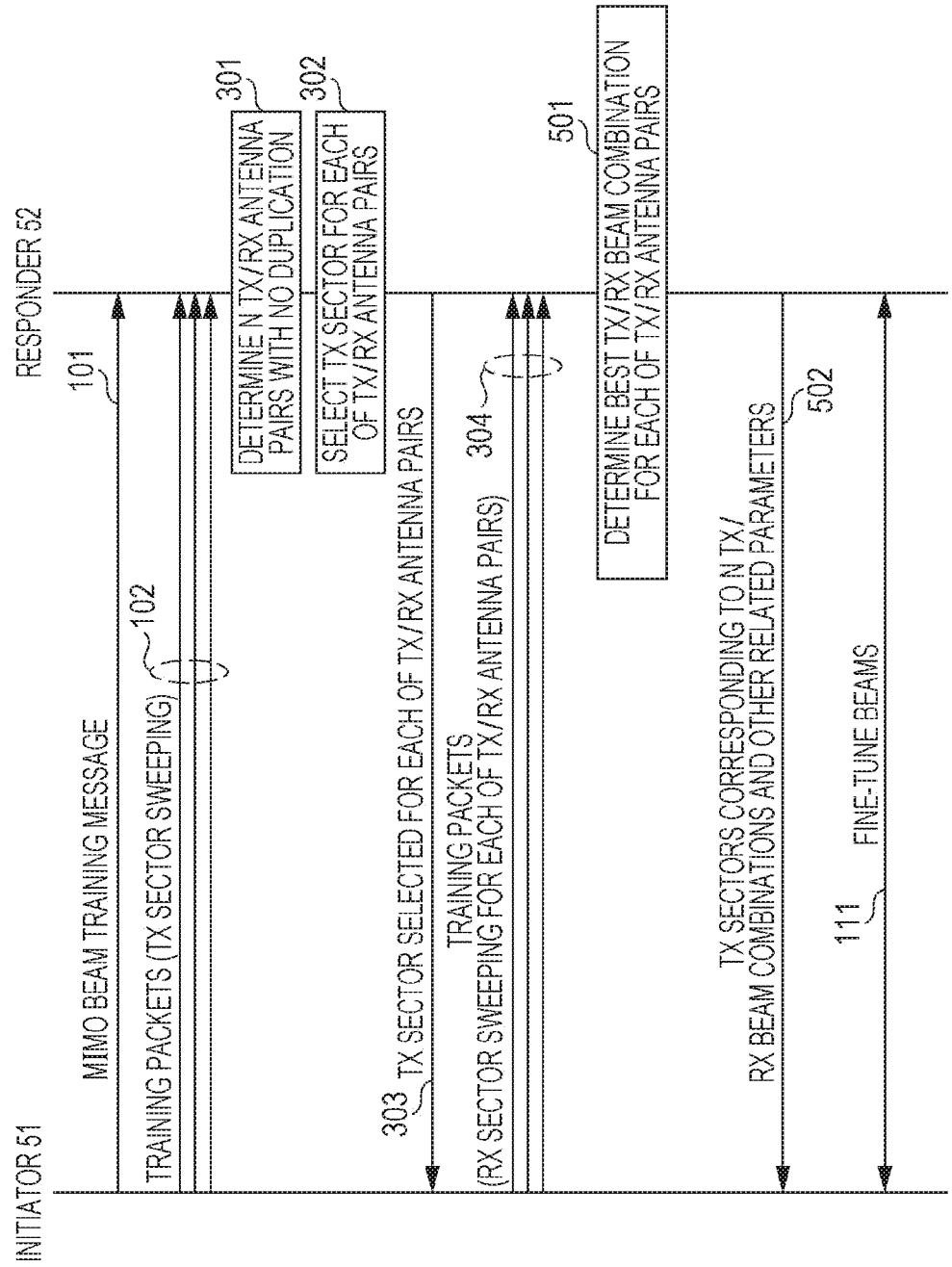
FIG. 23 is a sequence diagram of an antenna beam training process according to a third exemplary embodiment of the present disclosure.

FIG. 23 is a flowchart of the antenna beam training process for a MIMO operation performed by the wireless system 50 according to the present exemplary embodiment. Note that in FIG. 23, processes similar to those of the second exemplary embodiment (FIG. 16) are identified with the same reference numerals, and descriptions of the processes are not repeated.

In step 501, the responder 52 determines the best TX/RX beam combination for each of the TX/RX antenna pairs on the basis of the received signal quality measured in step 304.

In step 502, the responder 52 feeds back, to the initiator 51, the TX sectors corresponding to the N best TX/RX beam combinations determined in step 501.

Particular Example of Determining TX/RX Beam Combination

Figure 24:
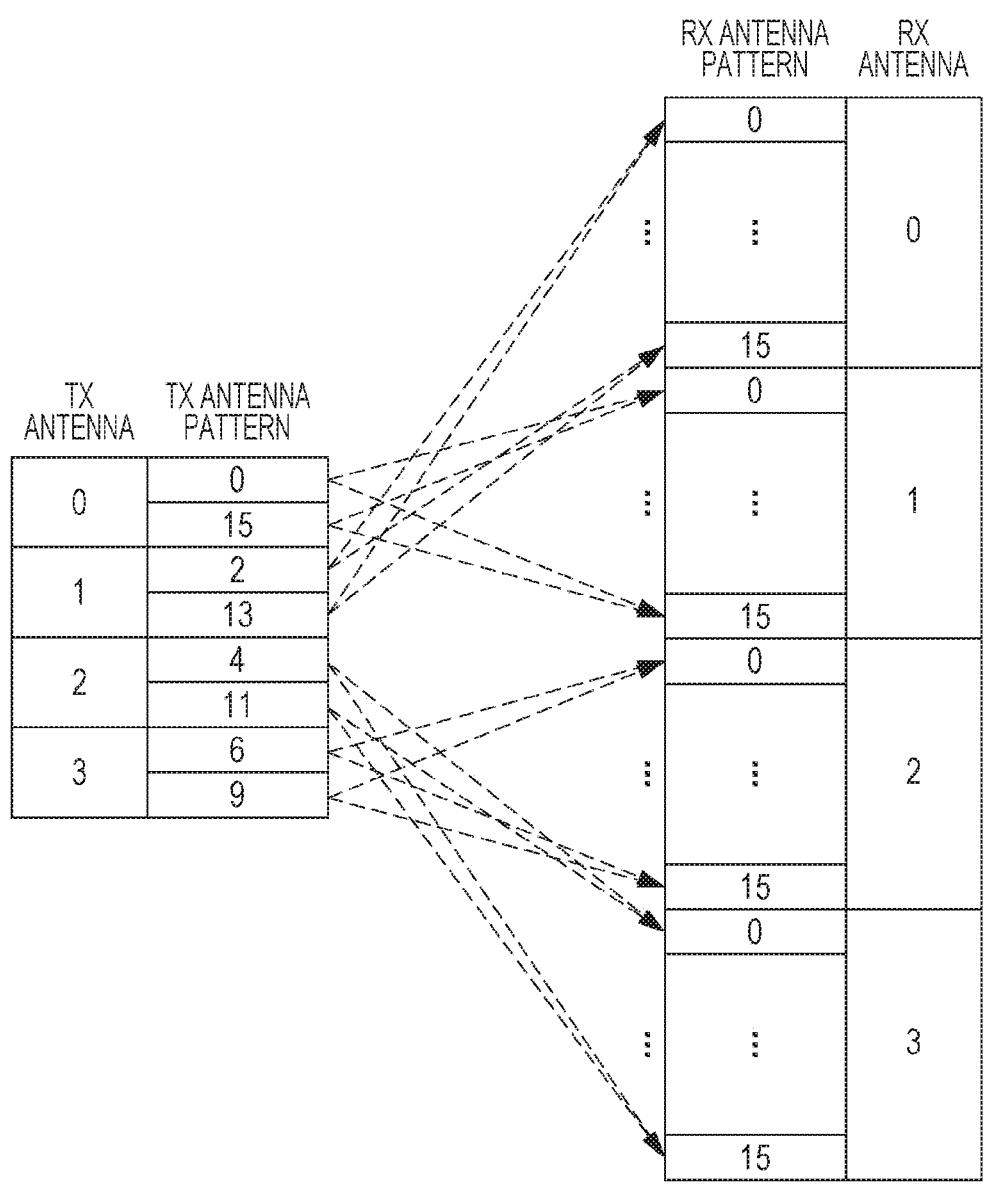
FIG. 24 illustrates an example of RX sector sweeping according to the third exemplary embodiment of the present disclosure.

FIGS. 24 and 25 illustrate a particular example of determining a TX/RX beam combination. Note that in FIGS. 24 and 25, each of the number of the TX antennas and the number of the RX antennas is set to 4, and the number of sectors of each of the antennas (the number of antenna patterns) is set to 16. In addition, the TX sector sweeping according to the present exemplary embodiment is the same as that of the second exemplary embodiment. For example, the result illustrated in FIG. 18 is obtained.

FIG. 24 illustrates a particular example of an RX sector sweeping process according to the present exemplary embodiment. As illustrated in FIG. 24, the initiator 51 transmits, to each of the 4 TX/RX antenna pairs (refer to FIG. 18), training packets via 2 selected TX sectors of each of TX antennas. In addition, as illustrated in FIG. 24, the responder 52 receives the training packets via the 16 RX sectors (RX antenna patterns) of the RX antenna which forms a pair with one of the TX antennas.

For example, in FIG. 24, the responder 52 receives the training packets transmitted from the selected TX sectors 0 and 15 of TX antenna 0 to the TX/RX antenna pair consisting of TX antenna 0 and RX antenna 1 via all the RX sectors 0 to 15 of RX antenna 1. Thereafter, as illustrated in FIG. 25, the responder 52 calculates the received signal quality (the SNR) for each of all the 32 TX/RX sector combinations for each of the TX/RX antenna pairs. Subsequently, the responder 52 selects the TX/RX sector combination having the best received signal quality for the TX/RX antenna pair (TX sector 15 and RX sector 7 in FIG. 25).

The same operation is performed for each of the other TX/RX antenna pairs. That is, in FIG. 25, the following combinations are selected: TX sector 13 of TX antenna 1 and RX sector 3 of RX antenna 0, TX sector 4 of TX antenna 2 and RX sector 6 of RX antenna 3, and TX sector 6 of TX antenna 3 and RX sector 5 of RX antenna 2.

A comparison of the TX/RX beam combination determination process according to the present exemplary embodiment (FIG. 24) and the TX/RX beam combination determination process according to the second exemplary embodiment (FIGS. 18 to 20 and FIGS. 21A and 21B) is discussed below. According to the second exemplary embodiment, in the RX sector sweeping (FIG. 20), the RX sectors are swept on the basis of the received signal quality between a TX antenna (an omni-directional antenna pattern) and each of all the RX sectors of an RX antenna for each of the TX/RX antenna pairs.

In contrast, according to the present exemplary embodiment, in the RX sector sweeping (FIG. 24), the RX sectors are swept on the basis of the received signal quality between a selected TX sector of a TX antenna and each of all the RX sectors of an RX antenna for each of the TX/RX antenna pairs. That is, according to the second exemplary embodiment, the RX sector sweeping and the beam combination training are separately performed. In contrast, according to the present exemplary embodiment, the beam combination training is performed concurrently in the RX sector sweeping. Thus, unlike the second exemplary embodiment, according to the present exemplary embodiment, transmission of training packets performed by a TX antenna having an omni-directional antenna pattern is not needed. As a result, the number of the training packets may be reduced.

Flow of Antenna Beam Training Process

Figure 26:
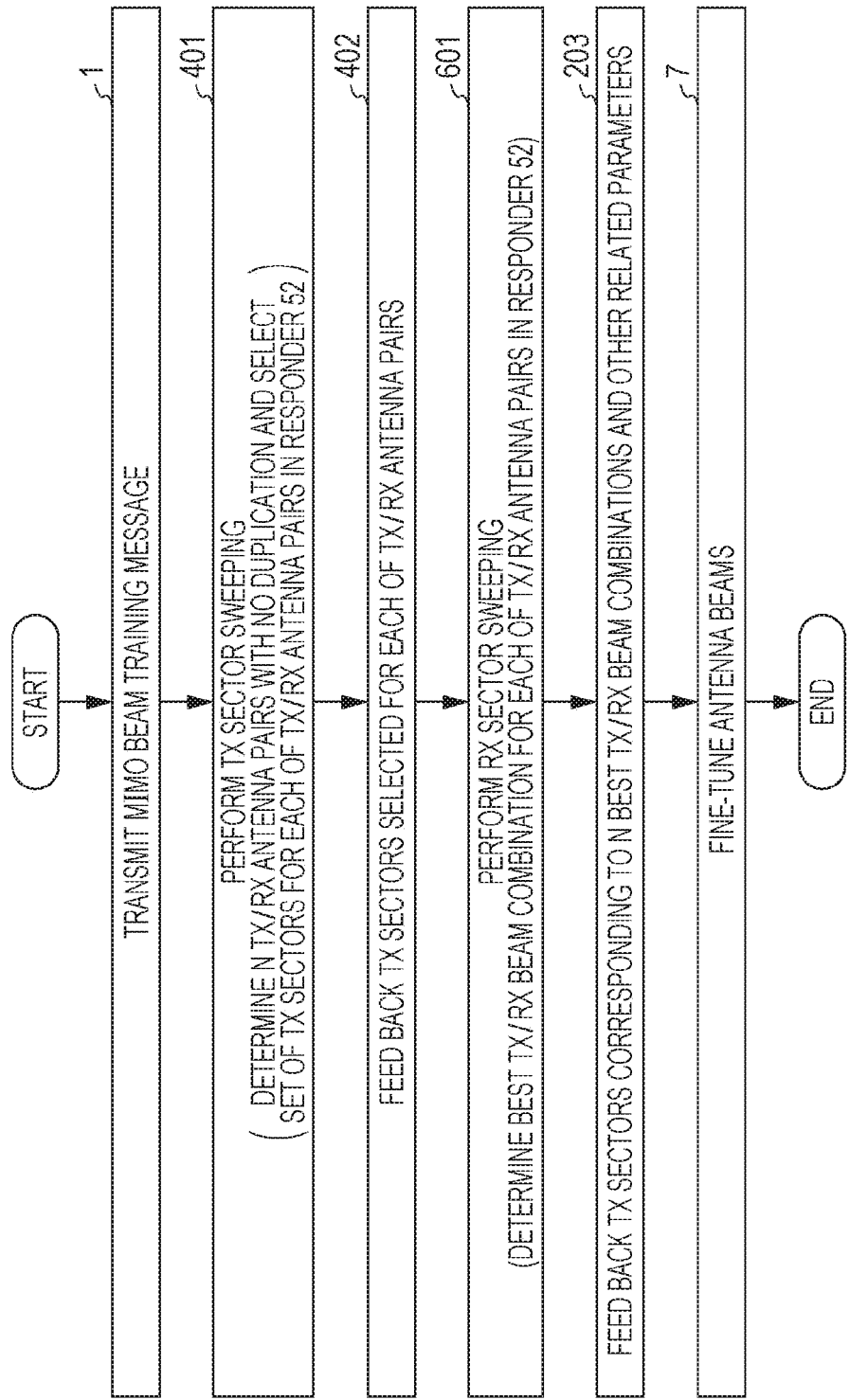
FIG. 26 is a flowchart of an antenna beam training process according to the third exemplary embodiment of the present disclosure.

FIG. 26 is a flowchart of the antenna beam training process for a MIMO operation performed by the wireless system 50 according to the present exemplary embodiment. Note that in FIG. 26, processes similar to those of the second exemplary embodiment (FIG. 22) are identified with the same reference numerals, and descriptions of the processes are not repeated.

In step 601, the RX sector sweeping is performed for each of TX/RX antenna pairs. More specifically, the initiator 51 transmits, to each of the N TX/RX antenna pairs, a plurality of training packets using the TX sector of each of the TX antennas selected in step 401. The responder 12 receives the plurality of training packets using all the sectors of the RX antenna that forms a pair with the TX antenna. The responder 52 selects the TX/RX beam combination having the best received signal quality for each of the TX/RX antenna pairs.

In this manner, according to the present exemplary embodiment, like the second exemplary embodiment, the TX/RX antenna pairs with no duplication are selected during the TX sector sweeping, and the best TX/RX beam combination is determined for each of the N TX/RX antenna pairs with no duplication. In this way, unlike the first exemplary embodiment, the number of training packets or the SNR calculation processes may be kept to minimum necessary in the RX sector sweeping and the beam combination training. Thus, the speed of beam training for a MIMO operation may be increased.

In addition, like the second exemplary embodiment, according to the present exemplary embodiment, when selecting a plurality of the TX/RX antenna pairs each having excellent received signal quality in the TX sector sweeping, the responder 52 removes the TX antenna and the RX antenna that form an already selected TX/RX antenna pair from subsequent selection. Thus, in a determined number (N) of best TX/RX antenna pairs selected as TX/RX antenna pairs used for the MIMO operation, the TX antennas and the RX antennas that form the pairs are not duplicate. In this way, a MIMO operation may be performed using the TX antennas and the RX antennas that form a single antenna beam/sector at a time.

Thus, like the first exemplary embodiment, according to the present exemplary embodiment, the wireless device including a plurality of array antennas may appropriately select the best TX/RX beam combination and normally perform a MIMO operation.

In addition, according to the present exemplary embodiment, determination of the N best TX/RX beam combinations is made in the RX sector sweeping. That is, unlike the first and second exemplary embodiments, according to the present exemplary embodiment, the beam combination training is not performed alone. That is, according to the present exemplary embodiment, transmission of training packets from a TX antenna having an omni-directional antenna pattern is not performed.

In general, there may be difficulty for a TX antenna to provide the omni-directional antenna pattern. The reason is as follows. In general, the omni-directional antenna pattern is provided by using a single antenna element. In a case where the omni-directional antenna pattern is provided by a single antenna element within certain power supply limits per transmission antenna element, the EIRP (Effective Isotropic Radiated Power) deteriorates due to the power gain, instead of the array gain.

For this reason, the present exemplary embodiment is suitable for, in particular, the wireless device 100*a* having the configuration illustrated in FIG. 15. More specifically, in a case where the present embodiment is applied to the wireless device 100*a* illustrated in FIG. 15, a TX sector corresponding to a TX/RX antenna pair is formed in the array antenna 109 of the wireless device 100*a* in the RX sector sweeping. As described above, like the configuration of the wireless device 100*a*, since in a configuration in which one transceiver is connected to each of the antenna elements, a signal is transmitted using the transmission power for one transceiver, it is difficult to obtain sufficient output power. In contrast, according to the present exemplary embodiment, since a transmitting-side wireless device 100*a* transmits the training packets on a sector basis using each of the array antennas 109, deterioration of the transmission power (the EIRP) may be prevented. Note that as described above, according to the present exemplary embodiment, the omni-directional antenna pattern is used on the receiving side during the TX sector sweeping (FIG. 18). However, since there is no limitation for supplied power on the receiving side, the problem caused by the power gain does not arise. In addition, in configurations that provide sufficient power, such as the configuration of a base station, the first exemplary embodiment and the second exemplary embodiment may be applied to the wireless device 100*a* having the configuration illustrated in FIG. 15 without the above-described deterioration of the EIRP that occurs on the transmitting side.

While the exemplary embodiments have been described with reference to the accompanying drawings, the present disclosure is not limited to the above-described examples. It is apparent that those skilled in the art may conceive the idea of a variety of modifications and updates within the scope of the present disclosure as defined by the appended claims, and the modifications and updates are to be encompassed by the technical scope of the disclosure. Furthermore, the constituent elements of the above-described embodiments may be combined in any way within the spirit and scope of the disclosure.

While the above-described exemplary embodiments have been described with reference to the configuration using hardware, the present disclosure may be achieved by using software in cooperation with hardware.

In addition, typically, the functional blocks used in the above descriptions of the exemplary embodiments are provided in the form of an LSI, which is an integration circuit. However, the functional blocks may be individually formed into one chip. Alternatively, some or all of the functional blocks may be formed into one chip. Although the term "LSI" is used herein, the terms including "IC," "system LSI," "super LSI" or "ultra LSI" may be used as well depending on the level of integration.

In addition, the circuit integration is not limited to LSI and may be achieved using dedicated circuitry or a general-purpose processor. A field programmable gate array (FPGA), which is programmable after fabrication of LSI, or a reconfigurable processor, which allows reconfiguration of connections and settings of circuit cells in LSI after fabrication of the LSI, may be used.

Should a circuit integration technology replacing LSI appear as a result of advancements in semiconductor technology or other technologies derived from the technology, the functional blocks could be integrated using such a technology. Another possibility is the application of biotechnology and/or the like.

The aspect of the present disclosure is effective for mobile communication systems.

What is claimed is:

1. A responder apparatus comprising:
   reception circuitry which includes a plurality of reception antennas and which, in operation, receives first training packets for transmission sector sweeping (TXSS) by an initiator apparatus that includes a plurality of transmission antennas, receives second training packets for reception sector sweeping (RXSS), and receives third training packets for beam combination training between the responder apparatus and the initiator apparatus; and
   determination circuitry, which in operation, obtains a subset of candidate transmission sectors for each of the plurality of transmission antennas, selects a subset of candidate reception sectors for each of the plurality of reception antennas, and determines N transmission/reception sector combinations from the subset of candidate transmission sectors and the subset of candidate reception sectors, each of the N transmission/reception sector combinations comprising a transmission sector and a reception sector, wherein N is an integer that is larger than one, and wherein each of the plurality of transmission antennas of the initiator apparatus corresponds to a single transmission sector and each of the plurality of reception antennas of the responder apparatus corresponds to a single reception sector.

2. The responder apparatus according to claim 1, comprising
   measuring circuitry, which, in operation, measures received signal quality of the first training packets and the second training packets, and
   wherein the determination circuitry selects the subset of candidate transmission sectors based on the measured received signal quality of the first training packets and selects the subset of candidate reception sectors based on the measured received signal quality of the second training packets.

3. The responder apparatus according to claim 2, wherein the measuring circuitry measures received signal quality of the third training packets and the determination circuitry determines the N transmission/reception sector combinations based on the measured received signal quality of the third training packets.

4. The responder apparatus according to claim 1, wherein a number of transmission/reception sector combinations, N, is recommended by the responder apparatus.

5. The responder apparatus according to claim 1, wherein no one transmission sector belongs to more than one transmission/reception sector combination and no one reception sector belongs to more than one transmission/reception sector combination, and wherein no one transmission antenna of the plurality of transmission antennas of the initiator apparatus is associated with more than one transmission sector and no reception antenna of the plurality of reception antennas of the responder apparatus is associated with more than one reception sector.

6. A communication method for a responder apparatus that includes a plurality of reception antennas, the communication method comprising:
   receiving first training packets for transmission sector sweeping (TXSS) by an initiator apparatus that includes a plurality of transmission antennas;
   receiving second training packets for reception sector sweeping (RXSS);
   receiving third training packets for beam combination training between the responder apparatus and the initiator apparatus;
   obtaining a subset of candidate transmission sectors for each of the plurality of transmission antennas;
   selecting a subset of candidate reception sectors for each of the plurality of reception antennas; and
   determining N transmission/reception sector combinations from the subset of candidate transmission sectors and the subset of candidate reception sectors, each of the N transmission/reception sector combinations comprising a transmission sector and a reception sector, wherein N is an integer that is larger than one, and wherein each of the plurality of transmission antennas of the initiator apparatus corresponds to a single transmission sector and each of the plurality of reception antennas of the responder apparatus corresponds to a single reception sector.

7. The communication method according to claim 6, comprising:
   measuring received signal quality of the first training packets and the second training packets, and
   wherein the subset of candidate transmission sectors is selected based on the measured received signal quality of the first training packets and the subset of candidate reception sectors is selected based on the measured received signal quality of the second training packets.

8. The communication method according to claim 7, comprising:
- measuring received signal quality of the third training packets; and
- wherein the N transmission/reception sector combinations are determined based on the measured received signal quality of the third training packets.

9. The communication method according to claim 6, wherein a number of transmission/reception sector combinations, N, is recommended by the responder apparatus.

10. The communication method according to claim 6, wherein no one transmission sector belongs to more than one transmission/reception sector combination and no one reception sector belongs to more than one transmission/reception sector combination, and wherein no one transmission antenna of the plurality of transmission antennas of the initiator apparatus is associated with more than one transmission sector and no reception antenna of the plurality of reception antennas of the responder apparatus is associated with more than one reception sector.

* * * * *